US011636370B2

(12) United States Patent
Romero et al.

(10) Patent No.: US 11,636,370 B2
(45) Date of Patent: Apr. 25, 2023

(54) QUANTUM COMPUTER WITH IMPROVED CONTINUOUS QUANTUM GENERATOR

(71) Applicant: Zapata Computing, Inc., Boston, MA (US)

(72) Inventors: Jhonathan Romero, Somerville, MA (US); Alan Aspuru-Guzik, Toronto (CA)

(73) Assignee: Zapata Computing, Inc., Boston, MA (US)

( * ) Notice: Subject to any disclaimer, the term of this patent is extended or adjusted under 35 U.S.C. 154(b) by 805 days.

(21) Appl. No.: 16/600,312

(22) Filed: Oct. 11, 2019

(65) Prior Publication Data
US 2020/0118025 A1 Apr. 16, 2020

Related U.S. Application Data

(60) Provisional application No. 62/888,239, filed on Aug. 16, 2019, provisional application No. 62/745,056, filed on Oct. 12, 2018.

(51) Int. Cl.
*G06N 10/00* (2022.01)
*G06N 20/10* (2019.01)
*G06N 20/20* (2019.01)
*G06N 3/08* (2023.01)

(52) U.S. Cl.
CPC .............. *G06N 10/00* (2019.01); *G06N 3/08* (2013.01); *G06N 20/10* (2019.01); *G06N 20/20* (2019.01)

(58) Field of Classification Search
CPC ........ G06N 10/00; G06N 20/10; G06N 20/20; G06N 3/0445; G06N 3/0454; G06N 3/0472; G06N 3/08; G06N 3/088
See application file for complete search history.

(56) References Cited

U.S. PATENT DOCUMENTS

| 9,663,358 | B1 | 5/2017 | Cory |
| 11,468,289 | B2 | 10/2022 | Cao et al. |
| 2007/0239366 | A1 | 10/2007 | Hilton et al. |
| 2007/0288684 | A1 | 12/2007 | Bergou et al. |
| 2015/0032994 | A1 | 1/2015 | Chudak |
| 2015/0317558 | A1 | 11/2015 | Adachi et al. |

(Continued)

FOREIGN PATENT DOCUMENTS

| EP | 3504667 A1 | 7/2019 |
| KR | 20160147988 A | 12/2016 |

(Continued)

OTHER PUBLICATIONS

Dallaire-Demers et al., "Quantum generative adversarial networks", Jul. 23, 2018, Physical Review A 98, 012324, pp. 1-8. (Year: 2018).*

(Continued)

*Primary Examiner* — Brent Johnston Hoover
(74) *Attorney, Agent, or Firm* — Blueshift IP, LLC; Robert Plotkin

(57) ABSTRACT

A hybrid quantum-classical (HQC) computer which includes both a classical computer component and a quantum computer component performs generative learning on continuous data distributions. The HQC computer is capable of being implemented using existing and near-term quantum computer components having relatively low circuit depth.

61 Claims, 8 Drawing Sheets

(56) References Cited

U.S. PATENT DOCUMENTS

| | | |
|---|---|---|
| 2015/0363708 A1 | 12/2015 | Amin et al. |
| 2016/0328253 A1 | 11/2016 | Majumdar |
| 2017/0223094 A1 | 8/2017 | Johnson et al. |
| 2017/0364362 A1 | 12/2017 | Lidar et al. |
| 2017/0364796 A1* | 12/2017 | Wiebe ............... G06N 10/00 |
| 2018/0165601 A1 | 6/2018 | Wiebe |
| 2018/0247200 A1 | 8/2018 | Rolfe |
| 2019/0197358 A1 | 6/2019 | Madani |
| 2019/0213495 A1 | 7/2019 | Babbush et al. |
| 2019/0354897 A1 | 11/2019 | Horesh et al. |
| 2019/0384597 A1 | 12/2019 | Horesh et al. |
| 2019/0393399 A1 | 12/2019 | Leipold |
| 2020/0057957 A1 | 2/2020 | Johnson |
| 2020/0117702 A1 | 4/2020 | Babbush |
| 2020/0134502 A1 | 4/2020 | Anschuetz |
| 2020/0394537 A1 | 12/2020 | Wang |
| 2021/0232963 A1 | 7/2021 | Gimeno-Segovia et al. |
| 2021/0256351 A1 | 8/2021 | Cao |
| 2021/0287761 A1 | 9/2021 | Camps et al. |
| 2022/0383177 A1 | 12/2022 | Alcazar et al. |

FOREIGN PATENT DOCUMENTS

| | | |
|---|---|---|
| WO | 2017001404 A1 | 1/2017 |
| WO | 2017066695 A1 | 4/2017 |
| WO | 2018064535 A1 | 4/2018 |
| WO | 2019032103 A1 | 2/2019 |
| WO | 2019077240 A1 | 4/2019 |
| WO | 2019177951 A1 | 9/2019 |
| WO | 2020037253 A1 | 2/2020 |
| WO | 2020077288 A1 | 4/2020 |
| WO | 2020086867 A1 | 4/2020 |
| WO | 2020077288 A9 | 3/2021 |
| WO | 2021102344 A1 | 5/2021 |
| WO | 2021163487 A1 | 8/2021 |
| WO | 2021247125 | 12/2021 |
| WO | 2022155277 A1 | 7/2022 |
| WO | 2022173497 A2 | 8/2022 |
| WO | 2022173497 A9 | 9/2022 |

OTHER PUBLICATIONS

Final Office Action dated Aug. 25, 2022, in U.S. Appl. No. 16/543,165 of Peter D. Johnson, filed Aug. 16, 2019, 73 pages.
International Search Report & Written Opinion dated Mar. 29, 2022, in international patent application No. PCT/US2022/012227, 6 pages.
Abadi, M., et al., "TensorFlow: Large-Scale Machine Learning on Heterogeneous Distributed Systems pp. 1-19 (Preliminary White Paper, Nov. 9, 2015)," software available from tensorflow.org, http://tensorflow.org/.
Amin, M.H., et al., "Quantum Boltzmann Machine," Physical Review X, vol. 8, No. 1, Available online https://journals.aps.org/prx/abstract/10.1103/PhysRevX.8.021050, pp. 021050-1-021050-11 (May 23, 2018).
Aspuru-Guzik, A., et al., "The Matter Simulation (R)evolution", ACS Cent. Sci., 4, 2, pp. 144-152 (2018).
Baydin, A. G., et al., "Automatic Differentiation in Machine Learning: a Survey", Journal of Machine Learning Research, vol. 18, No. 1, pp. 1-43 (2018).
Benedetti, M., et al., "A generative modeling approach for benchmarking and training shallow quantum circuits", arXiv preprint arXiv:1801.07686v4, pp. 1-16 (2019).
Benedetti, M., et al., "Quantum-assisted Helmholtz machines: A quantum-classical deep learning framework for industrial datasets in near-term devices," Quantum Physics, ArXiv 1708.09784v3, pp. 1-11 (Mar. 19, 2018).
Bengio, Y., et al., "Greedy layer-wise training of deep networks", NIPS'06: Proceedings of the 19th International Conference on Neural Information Processing Systems, pp. 1-8 (Dec. 2006).
Bergholm, V., et al., "PennyLane: Automatic differentiation of hybrid quantumclassical computations", arXiv preprint arXiv:1811.049683, pp. 1-15 (2018).
Biamonte, J., et al., "Quantum machine learning," Nature 549, pp. 195-292 (2016).
Boixo, S., et al., "Characterizing Quantum Supremacy in Near-Term Devices", Nature Physics, vol. 14, pp. 595-600 (2018).
Cao, Y., et al., "Quantum Neuron: an elementary building block for machine learning on quantum computers," arXiv:1711.11240v1, pp. 1-30 (2017).
Chen, H., et al., "Universal discriminative quantum neural networks", arXiv preprint arXiv:1805.08654v1, pp. 1-19 (May 22, 2018).
Cirq, https://github.com/quantumlib/Cirq, Available online, copyright 2019, 2 pages.
Creswell, A., et al., "Generative Adversarial Networks: An Overview", IEEE Signal Processing Magazine, vol. 35, No. 1, pp. 1-14 (2017).
Dallaire-Demers, P. L., et al., "Low-depth circuit ansatz for preparing correlated fermionic states on a quantum computer", arXiv preprint arXiv:1801.01053v1, pp. 1-15 (2018).
Dallaire-Demers, P. L., and Killoran, N., "Quantum generative adversarial networks", arXiv:1804.08641v2, Phys. Rev. A, vol. 98, 012324, pp. 1-10 (Apr. 30, 2018).
Dankert, C., et al., "Exact and approximate unitary 2-designs and their application to fidelity estimation", Physical Review A, vol. 80, No. 1, 012304, pp. 1-7 (Jul. 2009).
Du, Y., et al., "The Expressive Power of Parameterized Quantum Circuits", arXiv preprint arXiv:1810.11922V1, pp. 1-15 (2018).
Endo, S., et al., "Practical Quantum Error Mitigation for Near-Future Applications", Phys. Rev. X, vol. 8, 031027-1-031027-21 (2018).
Farhi, E., and Neven, H., "Classification with Quantum Neural Networks on Near Term Processors," arXiv preprint arXiv:1802.060022, pp. 1-21 (Aug. 30, 2018).
Farhi, E., et al., "A quantum approximate optimization algorithm," Quantum Physics, arXiv:1411.4028v1, pp. 1-16 (Nov. 14, 2014).
Gómez-Bombarelli, R., et al., "Automatic Chemical Design Using a Data-Driven Continuous Representation of Molecules", ACS Cent. Sci., vol. 4, No. 2, pp. 268-276 (2018).
Goodfellow, I. J., et al., "Generative adversarial nets", in Advances in neural information processing systems, pp. 1-9 (2014).
Goodfellow, I. J., et al., "Generative Adversarial Networks," arXiv:1406.2661v1 [stat.ML], 2014, pp. 1-9 (Jun. 10, 2014).
Goodfellow, I., "NIPS 2016 Tutorial: Generative Adversarial Networks", arXiv preprint arXiv:1701.00160v4, pp. 1-57 (2016).
Goodfellow, I., et al., "Deep Learning," Book, vol. 1 (MIT press Cambridge, 2016) available online at http://www.deeplearningbook.org, pp. 1-798.
Grant, E., et al., "Hierarchical quantum classifiers," npj Quantum Information, vol. 4, Article No. 65 ISSN 2056-6387, pp. 1-8 (2018).
Grover, L., and Rudolph, T., et al., "Creating superpositions that correspond to efficiently integrable probability distributions", arXiv preprint quantph/0208112v1, pp. 1-2 (2002).
Guimaraes, G., et al., "Objective-Reinforced Generative Adversarial Networks (ORGAN) for Sequence Generation Models", arXiv preprint arXiv:1705.10843v3, pp. 1-7 (2018).
Havlicek, V., et al., "Supervised learning with quantum enhanced feature spaces", arXiv:1804.11326v2, pp. 1-22 (Jun. 5, 2018).
He, K., et al., "Deep Residual Learning for Image Recognition", Proceedings of the IEEE conference on computer vision and pattern recognition, pp. 770-778 (2016).
Huggins, W., et al., "Towards quantum machine learning with tensor networks," Quantum Science and Technology, arXiv:1803.1153v2, vol. 4, No. 2, pp. 1-12 (Jul. 31, 2018).
International Search Report and Written Opinion dated Feb. 4, 2020, in International Patent Application No. PCT/US2019/055970, 11 pages.
Johnson, P. D., et al., "QVECTOR: an algorithm for device-tailored quantum error correction", arXiv preprint arXiv:1711.02249v1, pp. 1-16 (Nov. 7, 2017).
Kadurin, A., et al., "druGAN: An Advanced Generative Adversarial Autoencoder Model for de Novo Generation of New Molecules

(56) References Cited

OTHER PUBLICATIONS with Desired Molecular Properties in Silico," Molecular Pharmaceutics 2017, vol. 14, 9, pp. 3098-3104 (Jul. 13, 2017) (Abstract).
Kandala, A., et al., "Extending the computational reach of a noisy superconducting quantum processor", arXiv preprint arXiv:1805.04492v1, pp. 1-10 (2018).
Kandala, A., et al., "Hardware-efficient Variational Quantum Eigensolver for Small Molecules and Quantum Magnets", Nature, vol. 549, pp. 1-24 (2017).
Kieferova, M., et al, "Tomography and generative training with quantum Boltzmann machines," Phys. Rev. A, vol. 96, No. 6. 062327, pp. 1-2 (Dec. 22, 2017) (Abstract).
Liu, J., and Wang, L., "Differentiable learning of quantum circuit Born machines", Phys. Rev. A 98, 062324, pp. 1-9 (2018).
Lloyd, S., "Universal Quantum Simulators", Science, vol. 273, No. 5278, pp. 1073-1078 (Aug. 23, 1996).
Lloyd, S., and Weedbrook, C., "Quantum Generative Adversarial Learning", Phys. Rev. Lett. vol. 121, No. 4, pp. 040502-1-040502-5 (2018).
M. Plesch, M., and Brukner, C., "Quantum-State Preparation with Universal Gate Decompositions", Phys. Rev. A 83, arXiv:1003.5760v2, 032302, pp. 1-5 (Mar. 4, 2011).
McClean, J. R., et al., "Barren plateaus in quantum neural network training landscapes", Nature Communications, vol. 9, pp. 1-6 (2018).
McClean, J. R., et al., "The theory of variational hybrid quantum-classical algorithms", New Journal of Physics, vol. 18, pp. 1-22 (Feb. 5, 2016).
Mescheder, L., et al., "Which Training Methods for GANs do actually Converge?", International Conference on Machine Learning, pp. 1-39 (2018).
Mitarai, K. et al., "Quantum Circuit Learning," Phys. Rev. A 98, 032309, DOI:10.1103/PhysRevA.98.032309, arXiv:1803.00745 [quant-ph], pp. 1-7 (2019).
Neidinger, R. D., "Introduction to Automatic Differentiation and MATLAB Object-Oriented Programming", SIAM Review, vol. 52, No. 3, pp. 545-563 (2010).
Niemann, P., et al., "Logic Synthesis for Quantum State Generation," 2016 IEEE 46th International Symposium on Multiple-Valued Logic (ISMVL), Sapporo, pp. 247-252 (2016).
Paszke, A., et al., "Automatic differentiation in PyTorch", 31st Conference on Neural Information Processing Systems Long Beach, CA, USA, pp. 1-4 (NIPS 2017).
Perdomo-Ortiz, A., et al., "Opportunities and challenges for quantum-assisted machine learning in near-term quantum computers", Quantum Science and Technology, vol. 3, No. 3, pp. 1-14 (2018).
Yi-Zhuang You et al., "Machine learning spatial geometry from entanglement features," Phys. Rev. B 97, 045153, Jan. 31, 2018, 15 pages.
Damian S. Steiger et al., "Advantages of a modular high-level quantum programming framework," arXiv:1806.01861, Jun. 2018, 11 pages. Available online at: https://arxiv.org/abs/1806.01861.
Peng Zhao et al., "High-contrast ZZ interaction using superconducting qubits with opposite-sign anharmonicity," arXiv:2002.07560v2, Feb. 2020, 16 pages. Available online at: https://arxiv.org/abs/2002.07560.
International Search Report & Written Opinion dated Jan. 14, 2022, in international patent application No. PCT/US2021/024308, 7 pages.
Aliakbar Panahi et al., "word2ket: Space-efficient Word Embeddings inspired by Quantum Entanglement," International Conference on Learning Representations 2020, Mar. 3, 2020, arXiv:1911.04975, 10 pages.
Brassard, G., et al., "Quantum Amplitude Amplification and Estimation", arXiv:quant-ph/0005055v1, pp. 1-22 (May 15, 2000).
Wang, D., et al., "Accelerated Variational Quantum Eigensolver", arXiv:1802.00171v3, pp. 1-11 (Mar. 25, 2019).
Guillaume Verdon et al., "Quantum Hamiltonian-Based Models and the Variational Quantum Thermalizer Algorithm," Quantum Physics, arXiv:1910.02071, Oct. 4, 2019, 21 pages.

Seth Lloyd et al., "Quantum embeddings for machine learning," https://arxiv.org/abs/2001.03622, Feb. 10, 2020, 11 pages.
Wang, G., et al., "Minimizing Estimation Runtime on Noisy Quantum Computers," PRX Quantum 2.1 pp. 010346-1-49 (2021).
Dallaire-Demers, P.L., et al., "Quantum Generative Adversarial Networks," Physical Review A, vol. 98, No. 1, p. 012324, pp. 1-10 (Apr. 30, 2018).
Amin, M.H., et al., "Quantum Boltzmann Machine", Phys. Rev. X 8, 021050 URL:https://arxiv.org/abs/1601.02036, vol. 8, No. 2, Jan. 8, 2016, pp. 1-10.
Anschuetz, E.R., and Zanoci, C., "Near-Term Quantum-Classical Associative Adversarial Networks", Phys. Rev. A, URL: https://arxiv.org/abs/1905.13205, vol. 100, No. 5, 052327, pp. 1-11 (2019).
Eric R. Anschuetz et al., "Realizing Quantum Boltzmann Machines Through Eigenstate Thermalization," arXiv preprint, arXiv:1903.01359 [quant-ph], Mar. 4, 2019, 30 pages. Available online at https://arxiv.org/abs/1903.01359.
International Search Report and Written Opinion dated Jun. 7, 2021, in international patent application No. PCT/US2021/017863, 7 pages.
Kaneko, T., and Harada, T., "Noise Robust Generative Adversarial Networks", Cornell University, Available online at [https://arxiv.org/abs/1911.11776v1], Nov. 26, 2019, pp. 1-29.
He, Z., et al., "A Conditional Generative Model Based on Quantum Circuit and Classical Optimization", International Journal of Theoretical Physics, vol. 58, pp. 1138-1149 (2019).
Besnier, V., et al., "This Dataset Does Not Exist: Training Models From Generated Images", Available online at https://arxiv.org/abs/1911.02888, Nov. 7, 2019, pp. 1-6.
Ackley, D.H., et al., "A Learning Algorithm for Boltzmann Machines", Cognitive Science, vol. 9, No. 1, pp. 147-169 (1985).
Mandra, S., et al., "Strengths and weaknesses of weak-strong cluster problems: A detailed overview of state-of-the-art classical heuristics versus quantum approaches", Phys. Rev. A, vol. 94, No. 6, 022337, Aug. 29, 2016, pp. 1-14.
Benedetti, M., et al., "Estimation of effective temperatures in quantum annealers for sampling applications: A case study with possible applications in deep learning", Phys. Rev. A, vol. 94, No. 2, 022308, Aug. 9, 2016, pp. 1-15.
Srednicki, M., "Chaos and quantum thermalization", Phys. Rev. E, vol. 50, No. 2, 888, Aug. 1, 1994, pp. 1-30.
Deutsch, J.M., "Quantum statistical mechanics in a closed system", Phys. Rev. A, vol. 43, No. 4, Feb. 15, 1991, pp. 2046-2049.
D'Alessio, L., et al., "From quantum chaos and eigenstate thermalization to statistical mechanics and thermodynamics", Advances in Physics, vol. 65, No. 3, pp. 1-130 (2016).
Garrison, J.R., et al., "Does a Single Eigenstate Encode the Full Hamiltonian?" Physical Review X, vol. 8, No. 2, pp. 021026-1-021026-24 (2018).
Kaufman, A.M., et al., "Quantum thermalization through entanglement in an isolated many-body system", Science, vol. 353, No. 6301, Aug. 19, 2016, pp. 794-800.
Biamonte, J.D., et al., "Realizable Hamiltonians for universal adiabatic quantum computers", Phys. Rev. A, vol. 78, No. 1, 012352, pp. 1-7 (2008).
Kiefer, J., et al., "Stochastic Estimation of the Maximum of a Regression Function", Ann. Math. Statist. vol. 23, No. 3. pp. 462-466 (1952).
Spall, J.C., "A Stochastic Approximation Technique for Generating Maximum Likelihood Parameter Estimates", in 1987 American Control Conference, pp. 1161-1167 (1987).
Barahona, F., "On the computational complexity of Ising spin glass models", Journal of Physics A: Mathematical and General, vol. 15, No. 10, pp. 3241-3253 (1982).
Garcia-Saez, A., et al., "Local Temperature in Quantum Thermal States", vol. 79, No. 5, arXiv: 0808.0102v2, 02 Jun. 2, 2009, pp. 1-10.
Preskill, J., "Quantum Computing in the NISQ era and beyond", Jul. 31, 2018, pp. 1-20.
International Search Report and Written Opinion dated Feb. 10, 2020 in International patent application No. PCT/US2019/057893, 7 pages.

(56) References Cited

OTHER PUBLICATIONS

Schlittgen, B., et al., "Low-Energy Effective Theories of Quantum Spin and Quantum Link Models", Physical Review D, vol. 63. No. 8, pp. 1-29 (Mar. 19, 2001).

International Search Report and Written Opinion dated Dec. 6, 2019 in PCT International Patent Application No. PCT/US2019/046895, 9 pages.

Sarma, S.D., et al., "Majorana Zero Modes and Topological Quantum Computation", arXiv: 1501.02813v2, pp. 1-16, May 14, 2015 (retrieved on Nov. 17, 2019). Retrieved from <https://arxiv.org/abs/1501.02813>.

Purvis, G.D., et al., "A full coupled-cluster singles and doubles model: The inclusion of disconnected triples", The Journal of Chemical Physics, vol. 76, No. 4, pp. 1910-1918 (Feb. 15, 1982).

Chiles, R.A., et al., "An electron pair operator approach to coupled cluster wave functions. application to He2, Be2, and Mg2 and comparison with CEPA methods", The Journal of Chemical Physics, vol. 74, No. 8, pp. 4544-4556 (1981).

Handy, N.C., et al., "Size-consistent Brueckner theory limited to double substitutions", Chemical Physics Letters, vol. 164, No. 2-3, pp. 185-192 (Dec. 8, 1989).

Liu, Y., et al., "Quantum computational complexity of the N-representability problem: QMA complete", Physical review letters, vol. 98, No. 11, pp. 1-6 (2007).

Liu, Y., "The Complexity of the Consistency and N-Representability Problems for Quantum States", Quantum Physics, arXiv preprint arXiv:0712.3041, pp. 1-89 (2007).

Aspuru-Guzik, A., et al., "Simulated Quantum Computation of Molecular Energies", Science, Quantum Physics, vol. 309, No. 5741, pp. 1-21 (Sep. 9, 2005).

Goemans, M.X., et al., "Improved Approximation Algorithms for Maximum Cut and Satisfiability Problems Using Semidefinite Programming", Journal of the ACM (JACM), vol. 42, No. 6, pp. 1115-1145 (Nov. 1995).

Bogoljubov, N.N., "A New Method in the Theory of Superconductivity", Soviet Physics JETP, vol. 34, No. 7, pp. 41-46 (Jul. 1958).

Bach, V., et al., "Generalized Hartree-Fock Theory and the Hubbard Model", Journal of Statistical Physics, vol. 76 (1-2):3-89, pp. 1-68 (Nov. 25, 1993).

Bravyi, L. D., et al., "Fermionic Quantum Computation", Annals of Physics, vol. 298, No. 1, pp. 210-226 (2002).

McClean, J.R, et al., "Hybrid Quantum-Classical Hierarchy for Mitigation of Decoherence and Determination of Excited States", Physical Review A, vol. 95, No. 4, pp. 1-10 (2017).

Colless, J.I., et al., "Computation of Molecular Spectra on a Quantum Processor with an Error-Resilient Algorithm", Physical Review X, vol. 8, No. 1, pp. 011021-011027 (2018).

Rubin, N. C., et al., "Application of Fermionic Marginal Constraints to Hybrid Quantum Algorithms", New Journal of Physics, vol. 20, No. 5, 053020, pp. 1-21 (2018).

Wecker, D., et al., "Towards Practical Quantum Variational Algorithms", Physical Review A, vol. 92, No. 4, 042303, pp. 1-11 (2015).

Garcia-Saez, A., et al., "Addressing Hard Classical Problems with Adiabatically Assisted Variational Quantum Eigensolvers", Quantum Physics, arXiv preprint arXiv:1806.02287, pp. 1-7 (2018).

Johnson, P.D., et al., "A Method for Improving Quantum Optimization Algorithms: The Marginals Optimization Procedure", ICE 5th Conference on Quantum Information, Spain, (May 28-31, 2019), Book of Abstracts p. 59.

Wecker, D., et al., "Solving strongly correlated electron models on a quantum computer", Physical Review A, vol. 92, No. 6, pp. 1-27 (2015).

Jordan, P., et al., "In The Collected Works of Eugene Paul Wigner: Part A: The Scientific Papers—Chapter: Über das Paulische Äquivalenzverbot", pp. 109-129. Springer (1993).

Bonet-Monroig, "Comparison of Error itigation Strategies in a Hydrogen Molecule Quantum Simulation", Master thesis. Leiden University, pp. 1-52 (May 29, 2018).

Rubin, N.C., "A Hybrid Classical/Quantum Approach for Large-Scale Studies of Quantum Systems with Density Matrix Embedding Theory", Quantum Physics, arXiv:1610.06910 [quant-ph], pp. 1-10, (2016).

Reiher, M., et al., "Elucidating Reaction Mechanisms on Quantum Computers", PNAS, vol. 114, No. 29, pp. 1-28 (2016).

Motta, M., et al., "Low rank representations for quantum simulation of electronic structure", Computational Physics, Quantum Physics, arXiv:1808.02625v2, pp. 1-8 (Aug. 9, 2018).

Extended European Search Report dated Dec. 7, 2021, in European patent application 19871859.5, 14 pages.

Extended European Search Report dated Dec. 7, 2021, in European patent application 19874946.7, 11 pages.

"Quantum Computing: Progress and Prospects" National Academies of Sciences, Engineering, and Medicine, pp. 1-273 (2019).

Hempel, C. et al., "Quantum chemistry calculations on a trapped-ion quantum simulator," arxiv.org. Cornell University Library, 201 Olin Library Cornell University Ithaca, NY 14853, XP080859698, pp. 1-21 (Mar. 27, 2018).

Cubitt, T., and Montanaro, A., "Complexity Classification of Local Hamiltonian Problems", 2014 IEEE 55th Annual Symposium on Foundations of Computer Science, p. 2 (2014) (Abstract).

Dyakonov, M., "The case against Quantum Computing", IEEE Spectrum, pp. 1-5 (Nov. 15, 2018).

Extended European Search Report mailed May 19, 2022, in European patent application No. 19850377.3, 10 pages.

Gregory, A., and Chiang, C., "Simulation of Quantum Walks via Hamiltonian Reduction", 2018 IEEE Nanotechnology Symposium (ANTS), p. 1 (2018) (Abstract).

Horgan, J., "Will Quantum Computing Ever Live Up to Its Hype?", Quantum Computing, Scientific American, p. 6 (Apr. 20, 2021).

Colless, J.L, et al., "Robust determination of molecular spectra on a quantum processor," arxiv.org. Cornell University Library, 201 Olin Library Cornell University Ithaca, NY 14853, XP081278642, Doi: 10.1103/physrevx.8.011021, pp. 1-12 (Jul. 20, 2017).

Moll, N., et al, "Quantum optimization using variational algorithms on near-term quantum devices," Quantum Science and Technology, vol. 3, p. 18 (Jun. 19, 2018) [retrieved on Nov. 25, 2019]. Retrieved from <https://iopscience.iop.org/article/10.1088/2058-9565/aab822/pdf>.

Non-Final Office Action dated May 11, 2022, in U.S. Appl. No. 16/543,165 of Peter D. Johnson, filed Aug. 16, 2019, 26 pages.

Non-Final Office Action Mailed May 17, 2022, in U.S. Appl. No. 16/662,895 of Eric R. Anschuetz, filed Oct. 24, 2019, 29 pages.

Notice of Allowance dated Apr. 15, 2022, for U.S. Appl. No. 17/174,900 of Yudong Cao, filed Feb. 12, 2021, 10 pages.

Peruzzo, A., et al., "A variational eigenvalue solver on a photonic quantum processor", Nature Communications, vol. 5, Article No. 4213, pp. 1-7 (2014).

Preskill, J., "Quantum Computing in the NISQ era and beyond", arXiv preprint arXiv:1801.00862v3, pp. 1-20 (Jul. 31, 2018).

Quantum Information Software Kit (QISKit), https://qiskit.org/ (2018).

Radford, A., et al., "Unsupervised Representation Learning with Deep Convolutional Generative Adversarial Networks", arXiv preprint arXiv:1511.06434, pp. 1-16 (2015).

Rolfe, J.T., "Discrete Variational Autoencoders," ICLR, pp. 1-33 (Apr. 22, 2017).

Romero, J., et al., "Quantum autoencoders for efficient compression of quantum data," arXiv:1612.02806, pp. 1-10 (2016).

Romero, J., et al., "Quantum autoencoders for efficient compression of quantum data", Quantum Science and Technology, arXiv:1612.02806v2, vol. 2, No. 4, pp. 1-10 (Feb. 10, 2017).

Romero, J., et al., "Strategies for quantum computing molecular energies using the unitary coupled cluster ansatz", arXiv:1701.02691v2 [quant-ph], vol. 4, No. 4, pp. 1-18 (Feb. 10, 2018).

Romero, J., et al., "Strategies for quantum computing molecular energies using the unitary coupled cluster ansatz", Quantum Sci. Technol., vol. 4, No. 1, 014008, pp. 1-18 (2018).

Romero, J., et al., "Variational quantum generators: Generative adversarial quantum machine learning for continuous distributions," Quantum Physics, arXiv:1901.00848 [quant-ph], pp. 1-15 (Jan. 3, 2019).

(56) References Cited

OTHER PUBLICATIONS

Roth, R. M., et al., "Apathy Is Associated with Ventral Striatum Volume in Schizophrenia Spectrum Disorder", J Neuropsychiatry Clin Neurosci, 2016 Summe, vol. 28, No. 3, pp. 1-9 (Published online Feb. 22, 2016. doi: 10.1176/appi.neuropsych.15100241).
Aaronson, S., and Chen, L., "Complexity-Theoretic Foundations of Quantum Supremacy Experiments," arXiv:1612.05903v2, pp. 1-66 (Dec. 26, 2016).
Sanchez-Lengeling, B., and Aspuru-Guzik, A., "Inverse molecular design using machine learning: Generative models for matter engineering", Science 27, vol. 361, No. 6400, pp. 360-365 (Jul. 27, 2018).
Sanchez-Lengeling, B., et al., "Optimizing distributions over molecular space. An Objective-Reinforced Generative Adversarial Network for Inverse-design Chemistry (ORGANIC)", ChemRxiv preprint chemrxiv.5309668.v2, pp. 1-20 (2017).
Schuld, M., et al., "Circuit-centric quantum classifiers," arXiv preprint arXiv:1804.00633v1, pp. 1-17 (Apr. 2, 2018).
Schuld, M., et al., "Evaluating analytic gradients on quantum hardware", arXiv preprint arXiv:1811.11184v1, pp. 1-8 (2018).
Schuld, M., et al., "Quantum machine learning in feature Hilbert spaces," Quantum Physics, arXiv:1803.07128, pp. 1-12 (Mar. 19, 2018).
Shor, P. W., "Algorithms for quantum computation: Discrete logarithms and factoring", Proceedings 35th Annual Symposium on Foundations of Computer Science (Shafi Goldwasser, ed.), IEEE, pp. 124-134 (1994).
Sim, S., et al., "A framework for algorithm deployment on cloud-based quantum computers", arXiv preprint arXiv:1810.10576v1, pp. 1-10 (Oct. 24, 2018).
Situ, H., et al., "Quantum generative adversarial network for discrete data", arXiv preprint arXiv:1807.01235v5, pp. 1-22 (2019).
Smith, R. S., et al., "A Practical Quantum Instruction Set Architecture", arXiv preprint arXiv:1608.03355v2, pp. 1-15 (2016).
Soklakov, A. N., and Schack, R., "Efficient state preparation for a register of quantum bits", Phys. Rev. A, 012307, arXiv:quant-ph/0408045v2, vol. 73, No. 1, pp. 1-26 (Nov. 22, 2005).
Spall, J. C., "A one-measurement form of simultaneous perturbation stochastic approximation", Automatica, vol. 33, No. 1, pp. 109-112 (1997).
Spall, J. C., "Adaptive stochastic approximation by the simultaneous perturbation method," IEEE Transactions on Automatic Control, vol. 45, No. 10, pp. 1839-1853 (Oct. 2000).
Steiger, D. S., et al., "ProjectQ: An Open Source Software Framework for Quantum Computing", Quantum, arXiv:1612.08091v2. vol. 2, pp. 1-13 (2016).
Temme, K., et al., "Error Mitigation for Short-Depth Quantum Circuits," Physical review letters, vol. 119, No. 18, 180509, pp. 1-15 (2017).
Valiant, L. G., "Quantum computers that Can Be Simulated Classically in Polynomial Time", SIAM Journal on Computing, vol. 31, No. 4, pp. 1-10 (2002).
Verdon, G., et al., "A quantum algorithm to train neural networks using low-depth circuit," Quantum Physics (quant-ph); Disordered Systems and Neural Networks (cond-mat.dis-nn), arXiv:1712.05304 [quant-ph], pp. 1-9 (2017).
Verdon, G., et al., "A quantum algorithm to train neural networks using low-depth circuits", Quantum Physics, arXiv:1712.05304 [quant-ph], pp. 1-9 (Dec. 14, 2017).
Wan, K. H., et al., "Quantum generalisation of feedforward neural networks", npj Quantum Information, vol. 3, Article No. 36, arXiv:1612.01045, pp. 1-8 (2017).
Wecker, D., et al., "Progress towards practical quantum variational algorithms", Phys. Rev. A 92, 042303, pp. 1-11 (2015).
Wendin, G., "Quantum information processing with superconducting circuits: a review," Reports on Progress in Physics, vol. 80, No. 10, pp. 108 (2017).
Zeng, J., et al., "Learning and Inference on Generative Adversarial Quantum Circuits", arXiv preprint arXiv:1808.02893, vol. 99, No. 5, pp. 1-7 (2018).
Zeng, J., et al., "Learning and Inference on Generative Adversarial Quantum Circuits", arXiv preprint arXiv:1808.03425v1, pp. 1-7 (2018).
Gao, N., et al., "High Dimensional Similarity Search with Quantum-Assisted Variational Autoencoder," arXiv:2006.0768v1, Available at URL https://arxiv.org/pdf/2006.07680.pdf, pp. 1-9 (Jun. 13, 2020).
Han, Z., et al., "Unsupervised Generative Modeling Using Matrix Product States," arXiv:1709.01662v3, Available online at URL https://arxiv.org/pdf/1709.01662.pdf, pp. 1-13 (Jul. 19, 2018).
International Search Report and Written Opinion dated Sep. 29, 2022, in PCT patent application No. PCT/US2021/062191, 8 pages.
Niu, M.Y., et al., "Learnability and Complexity of Quantum Samples," arXiv:2010.11983v1. Available at URL < https://arxiv.org/pdf/2010.11983.pdf>, pp. 1-19 (Oct. 22, 2020).
Yang, S., et al., "Loop Optimization for Tensor Network Renormalization," arXiv:1512.04938v2, Available online at URL <https://arxiv.org/pdf/1512.04938.pdf>, vol. 118, No. 11, pp. 1-15 (Feb. 25, 2017).
McKinsey & Company, "Quantum Technology Monitor", pp. 1-53 (Jun. 2022).
Non-Final Office Action dated Dec. 6, 2022, in U.S. Appl. No. 16/543,165 of Peter D. Johnson, filed Aug. 16, 2019, 23 pages.
Notice of Allowance dated Nov. 4, 2022, in U.S. Appl. No. 16/662,895 of Eric R. Anschuetz, filed Oct. 24, 2019, 51 pages.

* cited by examiner

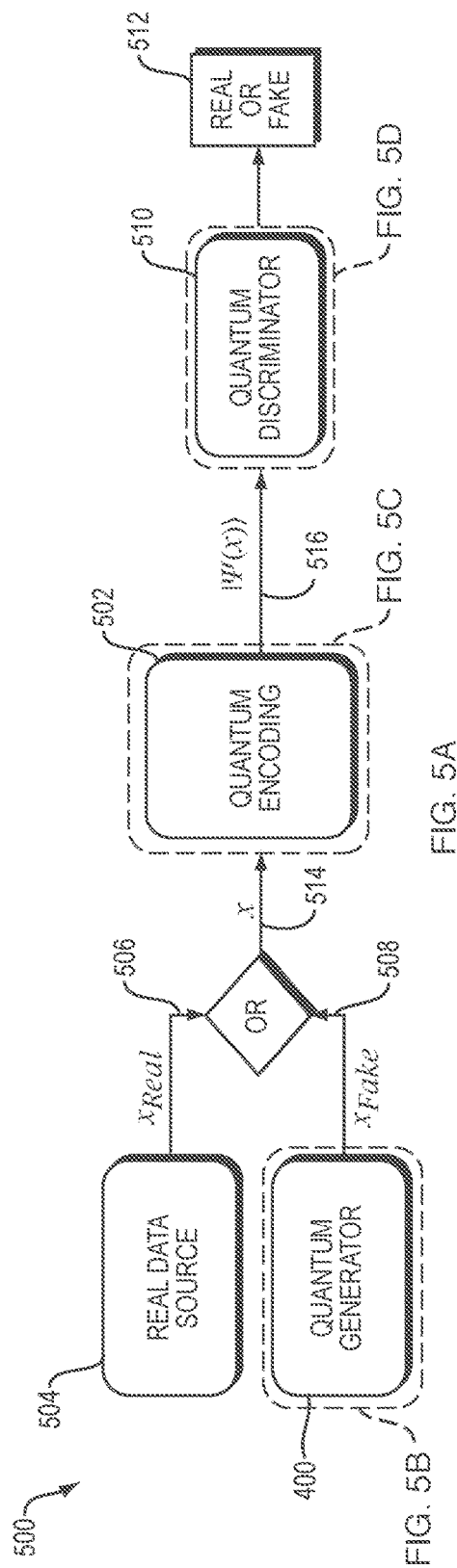
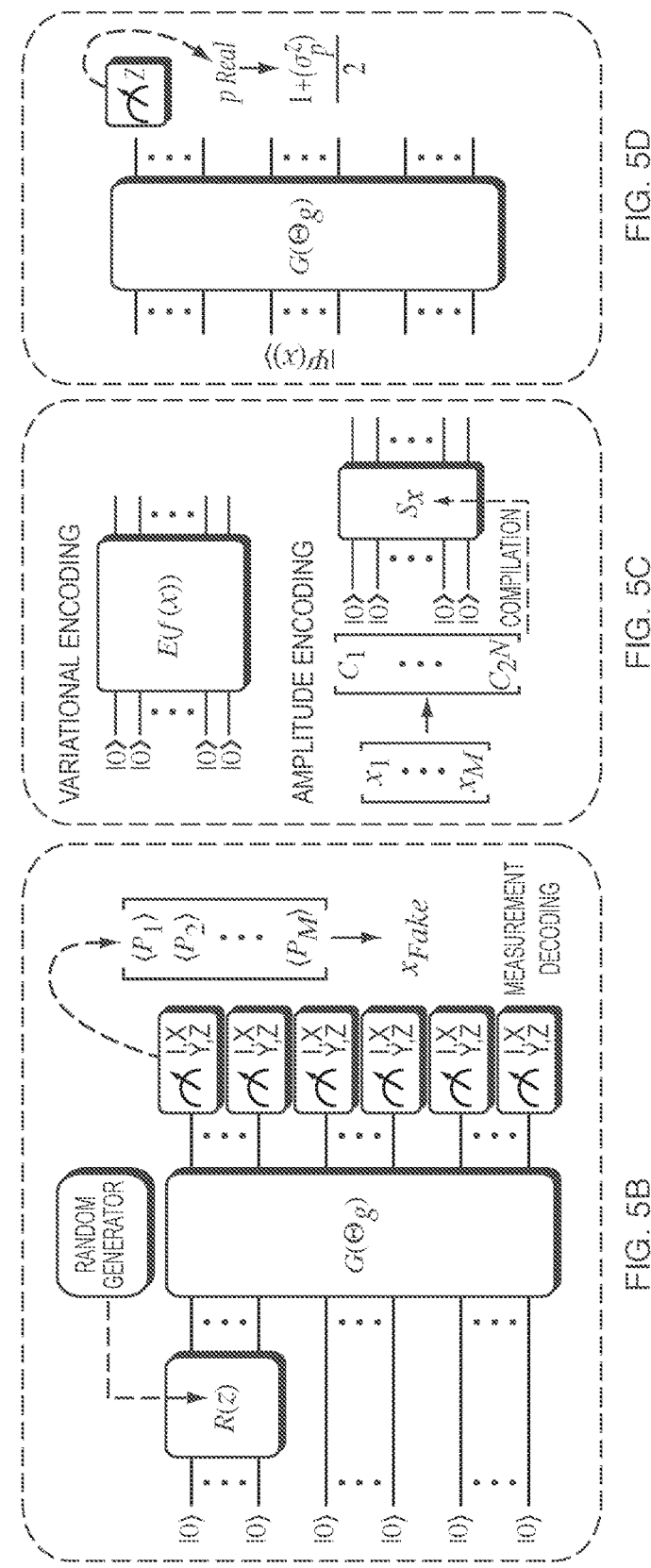

QUANTUM COMPUTER WITH IMPROVED CONTINUOUS QUANTUM GENERATOR

BACKGROUND

Quantum computers promise to solve industry-critical problems which are otherwise unsolvable. Key application areas include chemistry and materials, bioscience and bioinformatics, optimization, machine learning and finance. Interest in quantum computing has recently surged, in part, due to a wave of advances in the performance of ready-to-use quantum computers.

One problem to which quantum computers have been applied is generative learning. Existing quantum models for generative learning collect data by measuring the system as a Born machine, which is convenient for discrete data distributions, but which are difficult or impossible to adapt to continuous data distributions. Furthermore, the existing quantum Boltzmann machine (QBM) model requires sufficient thermalization, which in practice has been hard to achieve.

What is needed, therefore, are improvements to quantum computers for performing generative learning on continuous data distributions.

SUMMARY

A hybrid quantum-classical (HQC) computer which includes both a classical computer component and a quantum computer component performs generative learning on continuous data distributions. The HQC computer is capable of being implemented using existing and near-term quantum computer components having relatively low circuit depth.

One aspect of the present invention is directed to a device comprising a variational quantum generator circuit comprising: a first quantum encoding circuit, which receives as input a real value z from a classical distribution and encodes the real value as an input quantum state $|R(z)\rangle$, having r qubits; and a quantum generator circuit $G(\Theta_g)$, which receives the input quantum state and acts on a register of n qubits including the input quantum state, with n≥r, and which generates classical data $x_{Fake}$ by measuring, by a measurement decoding component, at least one expectation value of a fixed set of observables.

The at least one expectation value of the fixed set of observables may be expressed as strings of Pauli matrices $\{P_i\}_{i=1,\ldots,M}$, as shown in the following equation:

$$x_{Fake} = f(\alpha[\langle P_1 \rangle, \langle P_2 \rangle, \ldots, \langle P_M \rangle] + \beta)$$

where $\langle P_i \rangle = \langle \psi(x)|P_i|\psi(x)\rangle$, and $\alpha$ and $\beta$ are real parameters that adjust range of the observed data and $f$ is a mathematical function acting on the composed output measurements.

The device may further include functionality for transmitting the generated data $x_{Fake}$ to a classical computing component for additional processing. The device may further include functionality for transmitting the generated data $x_{Fake}$ to a classical discriminator executed by a classical computing component for additional processing. They may further include functionality for transmitting the generated data $x_{Fake}$ to a neural network executed by a classical computing component for additional processing.

The measurement decoding component may further include functionality for applying a measurement decoding scheme to a value stored by at least one of the n qubits, wherein applying the measurement decoding scheme modifies the physical state of the measured qubit. The quantum generator circuit may further include functionality for modifying a physical state of at least one qubit in the register of n qubits to put the at least one qubit into the input quantum state in accordance with the result of applying an encoding scheme to the real value. The device may further include a second quantum encoding circuit receiving the real value x, applying a variational encoding algorithm to encode the real value x as a quantum state output, and transmitting the quantum output state to a quantum discriminator. The device may further include a second quantum encoding circuit receiving the real value x, applying an amplitude encoding algorithm to encode the real value x as a quantum state output, and transmitting the quantum output state to a quantum discriminator. The device may further include a second quantum encoding circuit receiving data $x_{Fake}$ from the quantum generator circuit, applying a variational encoding algorithm to encode the received data $x_{Fake}$ into a quantum output state, and transmitting the quantum output state to a quantum discriminator. The device may further include a second quantum encoding circuit receiving data $x_{Fake}$ from the quantum generator circuit, applying an amplitude encoding algorithm to encode the received data $x_{Fake}$ into a quantum output state, and transmitting the quantum output state to a quantum discriminator.

The device may further include a quantum discriminator receiving at least one quantum output state from a second quantum encoding circuit and measuring an observable in the received at least one quantum output state. Measuring the observable may include measuring a designated qubit. The quantum discriminator may further include functionality for applying a measurement scheme to measure the designated qubit, wherein applying the measurement scheme to measure the designated qubit modifies a physical state of the measured designated qubit. The quantum discriminator may further include functionality for identifying a probability that the quantum output state belongs to the received classical distribution based on the measurement of the designated qubit. The quantum discriminator may further include functionality for identifying a probability that the received at least one quantum output state belongs to the received data $x_{Fake}$ based on the measurement of the designated qubit. The quantum discriminator may further include functionality for evaluating a cost function representing a level of difference between the received input from the classical distribution and the received data $x_{Fake}$. The quantum discriminator may further include functionality for generating an optimized cost function representing a level of difference between the received input from the classical distribution and the received data $x_{Fake}$, wherein the received input further comprises a plurality of data points and the received data further comprises a plurality of data points. The quantum discriminator may further include functionality for applying a variational circuit to the received at least one quantum output state. The quantum discriminator may further include functionality for applying amplitude encoding to the received at least one quantum output state.

The device may further include: a classical computing component implementing a von Neumann architecture; and the quantum computing component may be in communication with the classical computing component. The quantum computing component may further include functionality for transmitting the generated data $x_{Fake}$ to the classical computing component for additional processing. The device may further include a classical discriminator, and the quantum computing component may further include functionality for transmitting the generated data $x_{Fake}$ to the classical discriminator executed by the classical computing component for additional processing. The classical computing component may include an artificial neural network, and the quantum computing component may further include functionality for transmitting the generated data $x_{Fake}$ to the artificial neural network for additional processing. The quantum generator circuit may further include functionality for applying a measurement decoding scheme to a value stored by at least one of the n qubits, wherein applying the measurement decoding scheme modifies a physical state of the measured qubit. The quantum generator circuit may further include functionality for modifying a physical state of at least one qubit in the register of n qubits to put the at least one qubit into the input quantum state in accordance with the result of applying an encoding scheme to the real value. The device may further include a second quantum encoding circuit receiving the real value z, applying a variational encoding algorithm to encode the real value z as a quantum state output, and transmitting the quantum output state to a quantum discriminator. The device may further include a second quantum encoding circuit receiving the real value z, applying an amplitude encoding algorithm to encode the real value z as a quantum state output, and transmitting the quantum output state to a quantum discriminator. The device may further include a second quantum encoding circuit receiving data $x_{Fake}$ from the quantum generator circuit, applying a variational encoding algorithm to encode the received data $x_{Fake}$ into a quantum output state, and transmitting the quantum output state to a quantum discriminator. The device may further include a second quantum encoding circuit receiving data $x_{Fake}$ from the quantum generator circuit, applying an amplitude encoding algorithm to encode the received data $x_{Fake}$ into a quantum output state, and transmitting the quantum output state to a quantum discriminator.

The device may further include a quantum discriminator receiving at least one quantum output state from a second quantum encoding circuit, applying a variational circuit to the received at least one quantum output state, and measuring a designated qubit in the received at least one quantum output state. The quantum discriminator may further include functionality for applying a measurement scheme to measure the designated qubit, wherein applying the measurement scheme modifies a physical state of the measured designated qubit. The quantum discriminator may further include functionality for identifying a probability that the quantum output state belongs to the received classical distribution based on the measurement of the designated qubit. The quantum discriminator may further include functionality for identifying a probability that the received at least one quantum output state belongs to the received data $x_{Fake}$ based on the measurement of the designated qubit. The quantum discriminator may further include functionality for generating an optimized cost function representing a level of difference between the received input from the classical distribution and the received data $x_{Fake}$.

The device may further include: a second quantum encoding circuit receiving the real value z, applying an encoding algorithm to encode the real value z as a quantum state output; and a quantum discriminator receiving the quantum output state from the second quantum encoding circuit, applying a variational circuit to the received at least one quantum output state, and measuring a designated qubit in the received at least one quantum output state to determine whether the quantum output state belongs to the classical distribution or to the received data $x_{Fake}$.

The device may further include: a second quantum encoding circuit receiving a value from the data $x_{Fake}$, applying an encoding algorithm to encode the received value as a quantum state output; and a quantum discriminator receiving the quantum output state from the second quantum encoding circuit, applying a variational circuit to the received at least one quantum output state, and measuring a designated qubit in the received at least one quantum output state to determine whether the quantum output state belongs to the classical distribution or to the data $x_{Fake}$.

The device may further include: functionality for transmitting, to the classical discriminator of the classical computing component, $x_{Fake}$.

Another aspect of the present invention is directed to a method performed by a device, the device comprising a variational quantum generator circuit. The method includes: at a first quantum encoding circuit in the variational quantum generator circuit, receiving as input a real value z from a classical distribution and encodes the real value as an input quantum state $|R(z)\rangle$, having r qubits; and at a quantum generator circuit $G(\Theta_g)$ in the variational quantum generator circuit: receiving the input quantum state and acts on a register of n qubits including the input quantum state, with n≥r, and generating classical data $x_{Fake}$ by measuring, by a measurement decoding component, at least one expectation value of a fixed set of observables.

Other features and advantages of various aspects and embodiments of the present invention will become apparent from the following description and from the claims.

BRIEF DESCRIPTION OF THE DRAWINGS

FIG. 5 is a diagram of a hybrid quantum-classical computer for implementing Generative Adversarial Network (GAN) according to one embodiment of the present invention;

DETAILED DESCRIPTION

Figure 1:
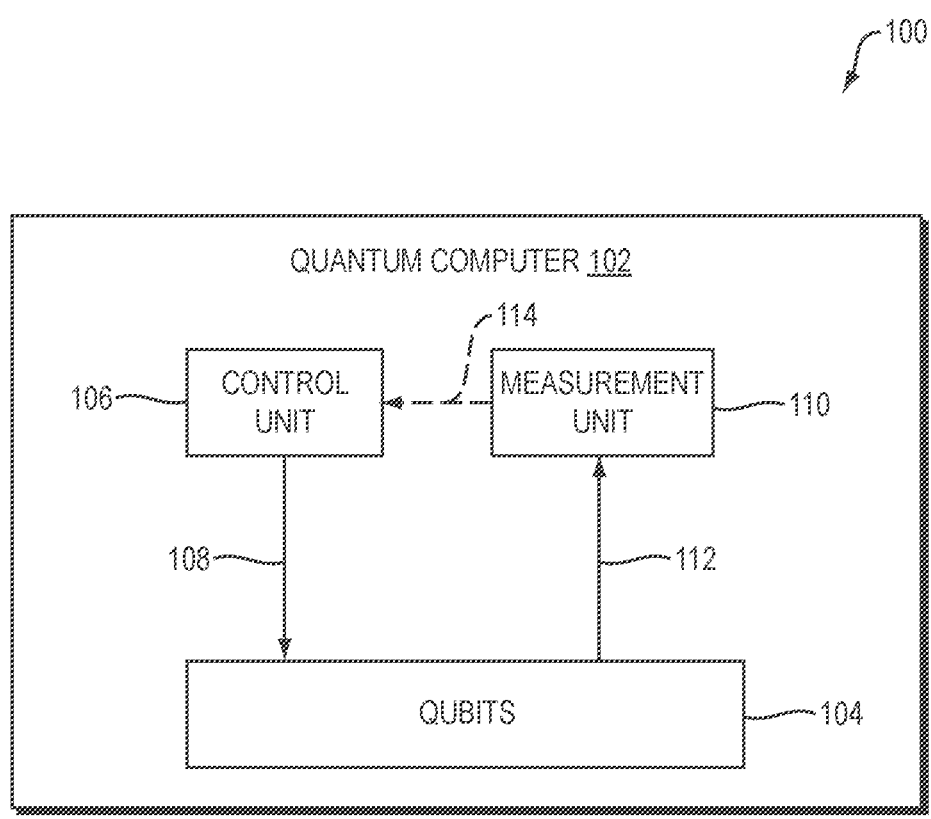
FIG. 1 is a diagram of a quantum computer according to one embodiment of the present invention.

Embodiments of the present invention are directed to a hybrid quantum-classical (HQC) computer, which includes both a classical computer component and a quantum computer component, for performing generative learning on continuous data distributions. A classical computer component may be, as those of ordinary skill in the art will understand, a machine based on the general computing model established by John Von Neumann. In this model, programs are written in the form of ordered lists of instructions and stored within the main memory of a computing system also having a central processing unit.

The quantum computing component may be provided by a physical system having certain characteristics, such as, as will be understood by those of ordinary skill in the art, the following: being a scalable physical system with well-characterized quantum bits (qubits) that may be initialized, in which the qubits have a coherence time longer than an operation time, from which qubit-specific measurements are attainable, and for which there is a universal set of quantum gates. As will be understood by those of ordinary skill in the art, a variety of physical systems may have these characteristics including, without limitation, approaches that use nuclear magnetic resonance, cavity quantum electrodynamics, Josephson junctions, quantum dots, and trapped-ion systems.

The quantum computing component may, for example, include a quantum processing unit (QPU) that exchanges data with a quantum memory (for example, memory distributed across a plurality of qubits) integrated on a chip, with instructions stored on a classical computer. A quantum computer component may include a plurality of qubits (for example, without limitation, elements such as superconducting loops made from a metal such as niobium that may be put into quantum mechanical superposition, for example, upon cooling the metal until it is a superconductor); the plurality of qubits may be connected to each other via elements such as couplers, which may also be, for example, superconducting loops. The QPU may include circuitry for addressing qubits and storing information retrieved from the qubits in a local memory. The QPU may include readout devices attached to each qubit and used to query a value held by each qubit upon completion of a measurement or other computation.

More generally, the HQC computer is capable of being implemented using existing and near-term quantum computer components having relatively low circuit depth, such as circuit ansatzes for state preparation with linear depth in the number of qubits or lower. For instance, the low depth circuit ansatz [Dallaire-Demers et al. arXiV:1801.01053] in 8 qubits (n=8) has a circuit primate with depth 32 two-qubit gates. In some embodiments, therefore, the HQC computer is a physical machine that improves upon classical computers by leveraging quantum computing hardware with enabled quantum mechanical characteristics.

As will be understood by those of ordinary skill in the art, in machine learning, discriminative models are trained to learn the conditional probability distribution of a target variable $y$ with respect to a set of observations $x$, $p(y|x)$. In contrast, generative models are trained to learn the joint probability distribution $p(x, y)$, or alternatively, the conditional probability of the observed data with respect to the target variable, $p(x|y)$. That is, a generative model learns to generate x—to imitate the data distribution. Providing a simple illustrative example, given a set of images of cats and dogs, a discriminative model learns to predict, given an image (x) whether it corresponds to a "dog" or a "cat" label (y); a generative model will instead learn how to generate images that look like cats or like dogs, by learning the conditional probability distribution p(x|y) or the joint distribution p(x,y). Neural networks are one example of a type of model that can be used for generative modeling. In some embodiments of the methods and systems described herein, quantum circuitry replaces and enhances the functionality provided by the neural network in performing generative modeling.

A variety of schemes may be used by embodiments of the present invention to use near-term quantum computers for assisting generative modeling tasks in classical machine learning. A first example of such a scheme uses quantum computers to assist in the realization of a Helmholtz machine. A second example of such a scheme uses quantum computers for generative adversarial networks (GAN).

The first scheme relates to the use of a quantum computer to provide an improved artificial neural network through the use of an HQC computer. In some embodiments, such a scheme results in improved functionality via the use of the hybrid quantum-classical computer by using classical restricted Boltzmann machines to compress a dataset in high dimensions to a latent space whose dimension is low enough for an implementation on a near-term quantum device, and to use the quantum device as a sampler in the latent space to generate new data points based on the given dataset.

In some embodiments, the quantum computer is a component within a hybrid quantum-classical (HQC) computer as described above, in which certain functionality is executed by the quantum computer (e.g., approximately preparing a thermal state of a Hamiltonian H, taking a measurement, and providing the measurement to the classical computer) and other functionality is executed by a classical computer. In one such embodiment, after preparing an approximate thermal state, the HQC may sample from the prepared thermal state in order to use the prepared state as a generative model in latent space. For example, a distribution $p_G(x)=Tr[(\Lambda_x \hat{\rho}$ (of samples X in the latent space originates the generative distribution; $\Lambda_{x_i}$ corresponds to an element of a positive-operator valued measure (POVM). The quantum computer can then obtain a measurement outcome x. In embodiments in which the quantum computer and a classical computer together form a hybrid quantum computer, the quantum computer may provide the measurement outcome x to the classical computer for use in implementing a generative distribution from a latent space to a hidden layer(s) $p_G(h|x)$ and from the hidden layer (s) to the data layer $p_G(d|h)$ (for example, by having the classical computer implement a restricted (classical) Boltzmann machine). In some embodiments, the quantum computer may replace a classical neural network on the classical computer with one or more quantum circuits provided by the quantum computer. In this way, one can leverage the connectivity aspects of the quantum computer (for example, as will be understood by those of skill in the art, the ability to connect or entangle qubits within a quantum circuit and perform operations on the connected qubits), as well as leveraging functionality for approximately preparing the thermal state of a quantum Hamiltonian to produce continuous data distributions. This is in contrast to previous systems which were typically limited to producing discrete data distributions.

Certain embodiments of the present invention are directed to an improved method for implementing a continuous quantum generator. The HQC computer 500 of FIG. 5 may, for example, be used to implement a Generative Adversarial Network (GAN) or to implement the functional equivalent of a GAN. The HQC computer 500 includes or is in communication with a data source 504 that makes available data 506 generated by a component external to the HQC computer 500—as a simple, illustrative example, and without limitation, a database may make available image files that were generated conventionally (e.g., by a camera and transferred to a computer or database that makes the image files available to the HQC computer 500). Such data may be referred to as "real" data 506, while data that a quantum component 400 generates in an attempt to create data that mimics the "real" data may be referred to as "synthetic" or "fake" data 508. The real data 506 may be represented by the variable $x \in \mathbb{R}^N$.

Figure 4:
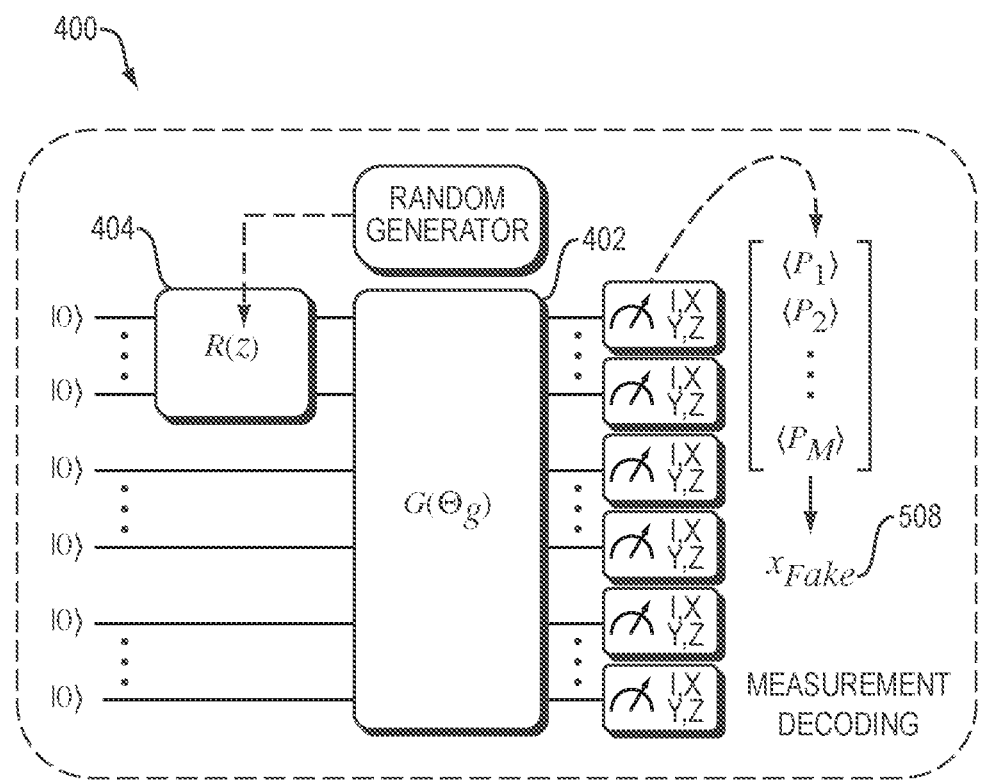
FIG. 4 is a diagram of a variational quantum generator circuit according to one embodiment of the present invention.

The HQC computer 500 includes a variational quantum generator circuit 400, the purpose of which is to convert the real data 506 into a quantum state and to produce classical samples $x_{Fake}$ 508 that mimic the observed distribution of the real data 506. More specifically, the variational quantum generator circuit 400 samples from a classic latent space, z, takes z, and transforms it into $x_{Fake}$ 508. In some embodiments, the model implemented by the quantum computer 500 (which may correspond to or include the variational circuit 400) captures correlations in the data better than a classic computer could, allowing the HQC 500 to generate better samples. FIG. 4 illustrates an example of such the quantum generator circuit 400. In the embodiment of FIG. 4, the circuit architecture of the quantum generator circuit 400 includes a circuit that generates states from a latent space (z) using the variational circuit $G(\Theta_g)$ 402. The classical vector z is encoded into a quantum state using a fixed encoding circuit, R 404, which maps by measuring a fixed set of operators on the generated state, thereby producing the fake sample $x_{Fake}$ 508.

The variational quantum generator 400 includes two variational circuits: (1) a first quantum encoding circuit R(z) 404, which acts on r qubits, and (2) a generator circuit $G(\Theta_g)$ 402 acting on a register of n qubits, with n>r. For example, to generate a black and white image of size 256×256 pixels encoded as a quantum state, the quantum generator circuit 400 would require 16 qubits (n=16). As will be understood by those of ordinary skill in the art, a register is a set of addressable qubits, addressable in the sense that they may be controlled and a quantum computer may include a component capable of performing operations on them.

In general, within the HQC computer 500 of FIG. 5, the variational quantum generator produces 400 classical samples 508 that try to mimic samples 506 produced by the real data source 504. The variational quantum generator circuit 400 acts as the generator model, mapping from the latent manifold to the manifold of observed data: $x:G(\Theta_g)|\phi(z)\rangle = |\psi(x)\rangle$. The quantum state $|\psi(x)\rangle$ encodes the information of the synthesized data x 508. To map the quantum state to a classical space, the variational quantum generator circuit 400 applies a measurement decoding scheme, in which the sample $x_{Fake}$ 508 is generated by measuring the expectation value of a fixed set of observables expressed as strings of Pauli matrices $\{P_i\}_{i=1,\ldots,M}$, as shown in Equation 1:

$$x_{Fake} = f(\alpha[\langle P_1 \rangle, \langle P_2 \rangle, \ldots, \langle P_M \rangle] + \beta) \quad \text{Equation 1}$$

where $\langle P_i \rangle = \langle \psi(x)|P_i|\psi(x)\rangle$, and $\alpha$ and $\beta$ are real parameters that adjust range of the observed data. $f$ may be a mathematical function acting on the composed output measurements. Note that $\alpha$ and $\beta$ need not be scalars—more generally, $\alpha$ may be a matrix and $\beta$ may be a vector. Notice that estimating x to precision $\in$ would scale as $O(M/\in^2)$, which is only linear on the size of the vector. In some embodiments, scaling may be improved by using other techniques, such as quantum phase estimation, in systems that provide increased coherence time. The associated measurement cost is not different from the cost associated with using other HQC algorithms, such as the Variational Quantum Eigensolver (VQE), in which a number of measurements that scales polynomially with the size of the quantum register are required to estimate the expectation value of the energy. The quantum generator circuit 400 may include functionality for applying a measurement decoding scheme to a value stored by at least one of the n qubits, wherein measurement of the stored value modifies the physical state of the measured qubit. The quantum generator circuit 400 may include functionality for modifying the physical state of at least one qubit in the register of n qubits to put the at least one qubit into the input quantum state in accordance with the result of applying an encoding scheme to the real value.

A quantum computing component may include the variational quantum generator circuit 400, whether in combination with a classical computing component as part of an HQC, or as a standalone quantum computer. The quantum computing component may include functionality for transmitting the generated data $x_{Fake}$ 508 to a classical computing component for additional processing (e.g., a component for determining whether an input is part of the real data 506 or part of $x_{Fake}$ 508). The quantum computing component may include functionality for transmitting the generated data $x_{Fake}$ 508 to a neural network executed by a classical computing component for additional processing. Alternatively, in some embodiments, the quantum computing component includes a quantum discriminator 510 that provides the functionality of a classical discriminator (e.g., determining whether an input is part of the real data 506 or part of $x_{Fake}$ 508, and providing output 512 indicating the result of this determination.) Alternatively, in some embodiments, the quantum discriminator 510 may be replaced by a classical discriminator, in which case the quantum encoding circuit 502 may be omitted, and instead the classical data 514 (e.g., the real data 506 and/or the fake data 508) may be provided directly to the classical discriminator.

Figure 6:
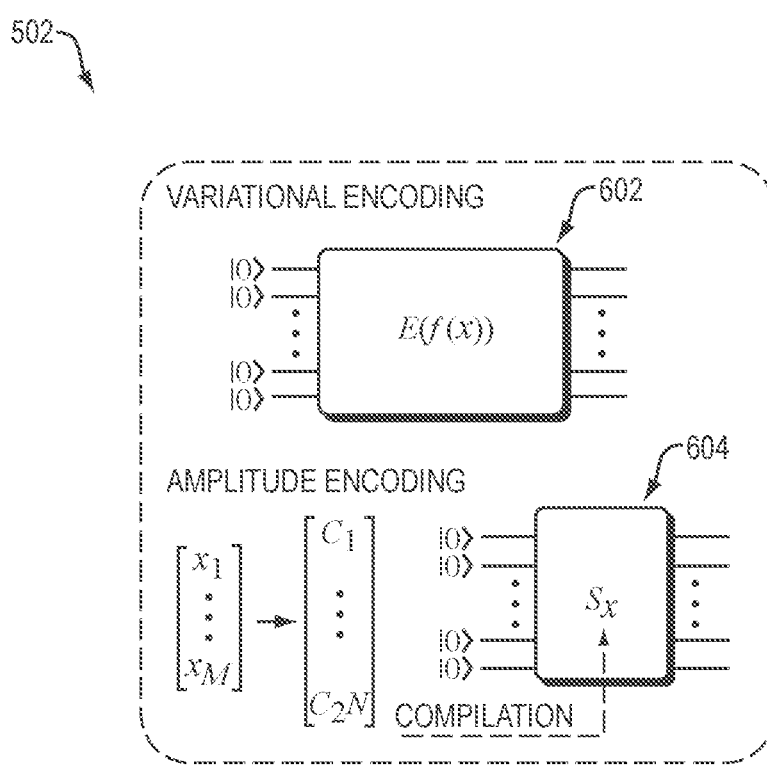
FIG. 6 is a diagram of a quantum encoder circuit implemented according to one embodiment of the present invention.

A second quantum encoding circuit 502 (shown in more detail in FIG. 6), which may correspond to a variational circuit of choice, may receive a random variable $x \in \mathbb{R}^d$ 514 (which may be, for example, a scalar) as a circuit parameter and generates a random selection of the state from the manifold of states prepared as $R(x)|0^{\otimes r}\rangle = |\phi(x)\rangle$. This is the quantum equivalent to the random source employed in classical Generative Adversarial Networks (GANs), where the space of the variable x would correspond to the latent space in the language of generative models and the corresponding manifold of states $\{|\phi(x)\rangle\}$ would correspond to the quantum latent space. The second quantum encoding circuit 502 maps classical information (e.g., as a vector) received from the real data source 504 or from the quantum generator 400 into a quantum state 516, which is then provided as input to the quantum discriminator 510. As one example, the second quantum encoding circuit 502 may use a variational encoding circuit 602 to perform at least part of the mapping. As another example, the second quantum encoding 502 circuit may use an amplitude encoding circuit 604 to perform at least part of the mapping.

A process of encoding classical inputs in a quantum state may be interpreted as applying a nonlinear feature map that maps data to a quantum Hilbert space, a process also called quantum feature map or quantum encoding, as described by Schuld et al., "Quantum Machine Learning in Feature Hilbert Spaces," arXiv:1803.07128 (2018). The quantum circuit implementing this mapping on a digital quantum computer corresponds to the quantum feature circuit or encoding circuit 502. Classes of such quantum encoding include amplitude encoding and variational encoding.

Amplitude encoding (such as may be implemented by the amplitude encoding circuit 604) may include a process of transforming a vector $x \in \mathbb{R}^N$, corresponding to the data to be encoded, under a feature map that maps the information to a quantum state in n qubits. Since the length of the data vector is not necessarily a power of 2, the feature map might require some padding and appropriate normalization. Once the corresponding input state is obtained, the state may be prepared on a quantum register of n qubits, $|\phi(x)\rangle$ using a preparation circuit Sx such that $Sx|0\rangle^{\otimes n}=|\psi(x)\rangle$.

Variational encoding (such as may be implemented by the variational encoding circuit 602) may include a process in which a fixed variational circuit $E(f_E(x))$ encodes the data by inputting the classical information as the circuit parameters. Here, f is a classical feature map: $f_E: \mathbb{R}^N \to \mathbb{R}^M$, such as the final input state is prepared as $E(f(x))|0\rangle^{\otimes n}=|\phi(x)\rangle$.

Therefore, the second quantum encoding circuit 502 receives classical data 508 from the quantum generator 400 and classical data 506 from the real data source 504, converts the received classical data 514 from any source (classical or quantum) into a quantum state output 516 (using an encoding algorithm implemented by the quantum encoding circuit 502, such as a variational encoding algorithm or an amplitude encoding algorithm) and provides the quantum state output 516 to the quantum discriminator 510. Any particular quantum state output 516 by the second quantum encoding circuit 502 and received as input by the quantum discriminator 510 is produced as the result of encoding, by the second quantum encoding circuit 502, either real data 506 from the real data source 504 or fake data 508 received from the quantum generator 400.

Figure 7:
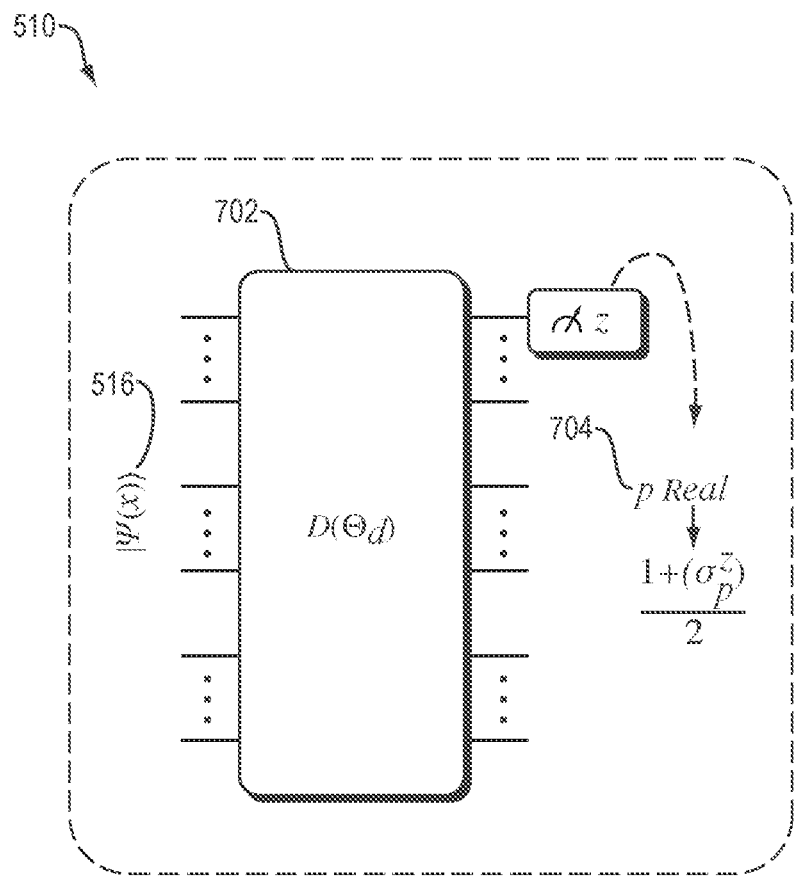
FIG. 7 is a diagram of a quantum discriminator circuit implemented according to one embodiment of the present invention.

The quantum discriminator 510 produces an output 512 indicating its determination (which may or may not be correct) of whether its input 516 was real (i.e., received from the real data source 506) or fake (i.e., received from the quantum generator 400). For example, and as shown in more detail in FIG. 7, the quantum discriminator 510 may include and apply a variational circuit 702 and measure a designated qubit in the received at least one quantum output state 516 on a computational basis; the probability of the state being zero is equivalent to the probability of the sample to be real. Measurement of the designated qubit may modify a physical state of the measured designated qubit. Based on the measurement of the designated qubit, the quantum discriminator may 510 identify a probability 704 that the quantum output state 516 belongs to the received classical distribution 506 or to the data $x_{Fake}$ 508 generated by the quantum generator 400. As an additional example, any observable or combination of observables may be measured and not just a designated qubit. The quantum discriminator 510 may generate an optimized cost function representing a level of difference between the received input 516 from the classical distribution 506 and the received data $x_{Fake}$ 508.

The quantum generator 400 learns how to improve the quality of subsequently generated data by its interaction with the quantum discriminator 510 (e.g., by receiving feedback in the form of output 512 indicating that the quantum discriminator 510 classified fake data 508 as real or as fake and improving subsequent data generation methods such that subsequent fake data 508 has an increased probability of being classified as real data by the quantum discriminator 510). The quantum discriminator 510, in turn, learns to distinguish between fake and real samples. Note that the functionality of the quantum discriminator 510 could be provided by a classical neural network while the generator 400 would still be a quantum generator. The interaction between the generator 400 and discriminator 510 may be regulated via optimization of one or more GAN cost functions, which correspond to the probability of success of the discriminator 510. The cost function of the generator 40 may be the same as the cost function of the discriminator 510. The cost function of the generator 400 may be different from the cost function of the discriminator 510 and each may be optimized independently. The optimization seeks to minimize this cost function with respect to the parameters of the generator 400 and maximize it with respect to the parameters of the discriminator 510.

In some embodiments, including those in which measurement decoding occurs as described above, the variational quantum generator 400 also includes a quantum decoder that inverts the operations of the quantum encoder; that is, the quantum decoder is the inverse of the quantum encoder in the sense that it extracts classical information from the quantum state while the quantum encoder maps classical information to a quantum state. In some embodiments, the purpose of decoding that occurs is to measure the outputs of the quantum generator and that measurement process includes decoding the outputs.

It is to be understood that although the invention has been described above in terms of particular embodiments, the foregoing embodiments are provided as illustrative only, and do not limit or define the scope of the invention. Various other embodiments, including but not limited to the following, are also within the scope of the claims. For example, elements and components described herein may be further divided into additional components or joined together to form fewer components for performing the same functions.

Various physical embodiments of a quantum computer are suitable for use according to the present disclosure. In general, the fundamental data storage unit in quantum computing is the quantum bit, or qubit. The qubit is a quantum-computing analog of a classical digital computer system bit. A classical bit is considered to occupy, at any given point in time, one of two possible states corresponding to the binary digits (bits) 0 or 1. By contrast, a qubit is implemented in hardware by a physical medium with quantum-mechanical characteristics. Such a medium, which physically instantiates a qubit, may be referred to herein as a "physical instantiation of a qubit," a "physical embodiment of a qubit," a "medium embodying a qubit," or similar terms, or simply as a "qubit," for ease of explanation. It should be understood, therefore, that references herein to "qubits" within descriptions of embodiments of the present invention refer to physical media which embody qubits.

Each qubit has an infinite number of different potential quantum-mechanical states. When the state of a qubit is physically measured, the measurement produces one of two different basis states resolved from the state of the qubit. Thus, a single qubit can represent a one, a zero, or any quantum superposition of those two qubit states; a pair of qubits can be in any quantum superposition of 4 orthogonal basis states; and three qubits can be in any superposition of 8 orthogonal basis states. The function that defines the quantum-mechanical states of a qubit is known as its wavefunction. The wavefunction also specifies the probability distribution of outcomes for a given measurement. A qubit, which has a quantum state of dimension two (i.e., has two orthogonal basis states), may be generalized to a d-dimensional "qudit," where d may be any integral value, such as 2, 3, 4, or higher. In the general case of a qudit, measurement of the qudit produces one of d different basis states resolved from the state of the qudit. Any reference herein to a qubit should be understood to refer more generally to a d-dimensional qudit with any value of d.

Although certain descriptions of qubits herein may describe such qubits in terms of their mathematical properties, each such qubit may be implemented in a physical medium in any of a variety of different ways. Examples of such physical media include superconducting material, trapped ions, photons, optical cavities, individual electrons trapped within quantum dots, point defects in solids (e.g., phosphorus donors in silicon or nitrogen-vacancy centers in diamond), molecules (e.g., alanine, vanadium complexes), or aggregations of any of the foregoing that exhibit qubit behavior, that is, comprising quantum states and transitions therebetween that can be controllably induced or detected.

For any given medium that implements a qubit, any of a variety of properties of that medium may be chosen to implement the qubit. For example, if electrons are chosen to implement qubits, then the x component of its spin degree of freedom may be chosen as the property of such electrons to represent the states of such qubits. Alternatively, the y component, or the z component of the spin degree of freedom may be chosen as the property of such electrons to represent the state of such qubits. This is merely a specific example of the general feature that for any physical medium that is chosen to implement qubits, there may be multiple physical degrees of freedom (e.g., the x, y, and z components in the electron spin example) that may be chosen to represent 0 and 1. For any particular degree of freedom, the physical medium may controllably be put in a state of superposition, and measurements may then be taken in the chosen degree of freedom to obtain readouts of qubit values.

Certain implementations of quantum computers, referred as gate model quantum computers, comprise quantum gates. In contrast to classical gates, there is an infinite number of possible single-qubit quantum gates that change the state vector of a qubit. Changing the state of a qubit state vector typically is referred to as a single-qubit rotation, and may also be referred to herein as a state change or a single-qubit quantum-gate operation. A rotation, state change, or single-qubit quantum-gate operation may be represented mathematically by a unitary 2×2 matrix with complex elements. A rotation corresponds to a rotation of a qubit state within its Hilbert space, which may be conceptualized as a rotation of the Bloch sphere. (As is well-known to those having ordinary skill in the art, the Bloch sphere is a geometrical representation of the space of pure states of a qubit.) Multi-qubit gates alter the quantum state of a set of qubits. For example, two-qubit gates rotate the state of two qubits as a rotation in the four-dimensional Hilbert space of the two qubits. (As is well-known to those having ordinary skill in the art, a Hilbert space is an abstract vector space possessing the structure of an inner product that allows length and angle to be measured. Furthermore, Hilbert spaces are complete: there are enough limits in the space to allow the techniques of calculus to be used.)

A quantum circuit may be specified as a sequence of quantum gates. As described in more detail below, the term "quantum gate," as used herein, refers to the application of a gate control signal (defined below) to one or more qubits to cause those qubits to undergo certain physical transformations and thereby to implement a logical gate operation. To conceptualize a quantum circuit, the matrices corresponding to the component quantum gates may be multiplied together in the order specified by the gate sequence to produce a $2n \times 2n$ complex matrix representing the same overall state change on n qubits. A quantum circuit may thus be expressed as a single resultant operator. However, designing a quantum circuit in terms of constituent gates allows the design to conform to a standard set of gates, and thus enable greater ease of deployment. A quantum circuit thus corresponds to a design for actions taken upon the physical components of a quantum computer.

A given variational quantum circuit may be parameterized in a suitable device-specific manner. More generally, the quantum gates making up a quantum circuit may have an associated plurality of tuning parameters. For example, in embodiments based on optical switching, tuning parameters may correspond to the angles of individual optical elements.

In certain embodiments of quantum circuits, the quantum circuit includes both one or more gates and one or more measurement operations. Quantum computers implemented using such quantum circuits are referred to herein as implementing "measurement feedback." For example, a quantum computer implementing measurement feedback may execute the gates in a quantum circuit and then measure only a subset (i.e., fewer than all) of the qubits in the quantum computer, and then decide which gate(s) to execute next based on the outcome(s) of the measurement(s). In particular, the measurement(s) may indicate a degree of error in the gate operation(s), and the quantum computer may decide which gate(s) to execute next based on the degree of error. The quantum computer may then execute the gate(s) indicated by the decision. This process of executing gates, measuring a subset of the qubits, and then deciding which gate(s) to execute next may be repeated any number of times. Measurement feedback may be useful for performing quantum error correction, but is not limited to use in performing quantum error correction. For every quantum circuit, there is an error-corrected implementation of the circuit with or without measurement feedback.

Some embodiments described herein generate, measure, or utilize quantum states that approximate a target quantum state (e.g., a ground state of a Hamiltonian). As will be appreciated by those trained in the art, there are many ways to quantify how well a first quantum state "approximates" a second quantum state. In the following description, any concept or definition of approximation known in the art may be used without departing from the scope hereof. For example, when the first and second quantum states are represented as first and second vectors, respectively, the first quantum state approximates the second quantum state when an inner product between the first and second vectors (called the "fidelity" between the two quantum states) is greater than a predefined amount (typically labeled E). In this example, the fidelity quantifies how "close" or "similar" the first and second quantum states are to each other. The fidelity represents a probability that a measurement of the first quantum state will give the same result as if the measurement were performed on the second quantum state. Proximity between quantum states can also be quantified with a distance measure, such as a Euclidean norm, a Hamming distance, or another type of norm known in the art. Proximity between quantum states can also be defined in computational terms. For example, the first quantum state approximates the second quantum state when a polynomial time-sampling of the first quantum state gives some desired information or property that it shares with the second quantum state.

Not all quantum computers are gate model quantum computers. Embodiments of the present invention are not limited to being implemented using gate model quantum computers. As an alternative example, embodiments of the present invention may be implemented, in whole or in part, using a quantum computer that is implemented using a quantum annealing architecture, which is an alternative to the gate model quantum computing architecture. More specifically, quantum annealing (QA) is a metaheuristic for finding the global minimum of a given objective function over a given set of candidate solutions (candidate states), by a process using quantum fluctuations.

Figure 2A:
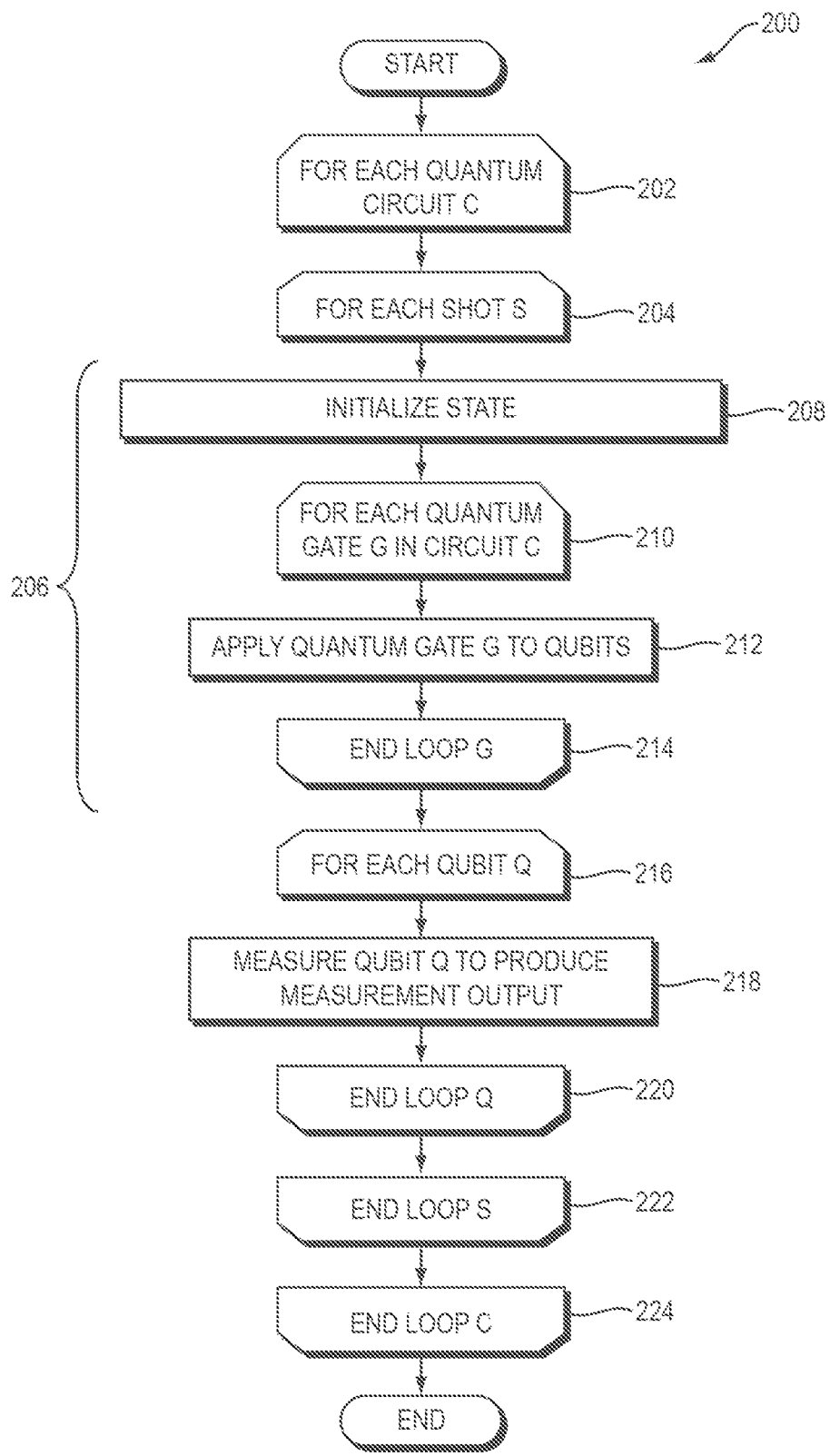
FIG. 2A is a flowchart of a method performed by the quantum computer of FIG. 1 according to one embodiment of the present invention.
Figure 2B:
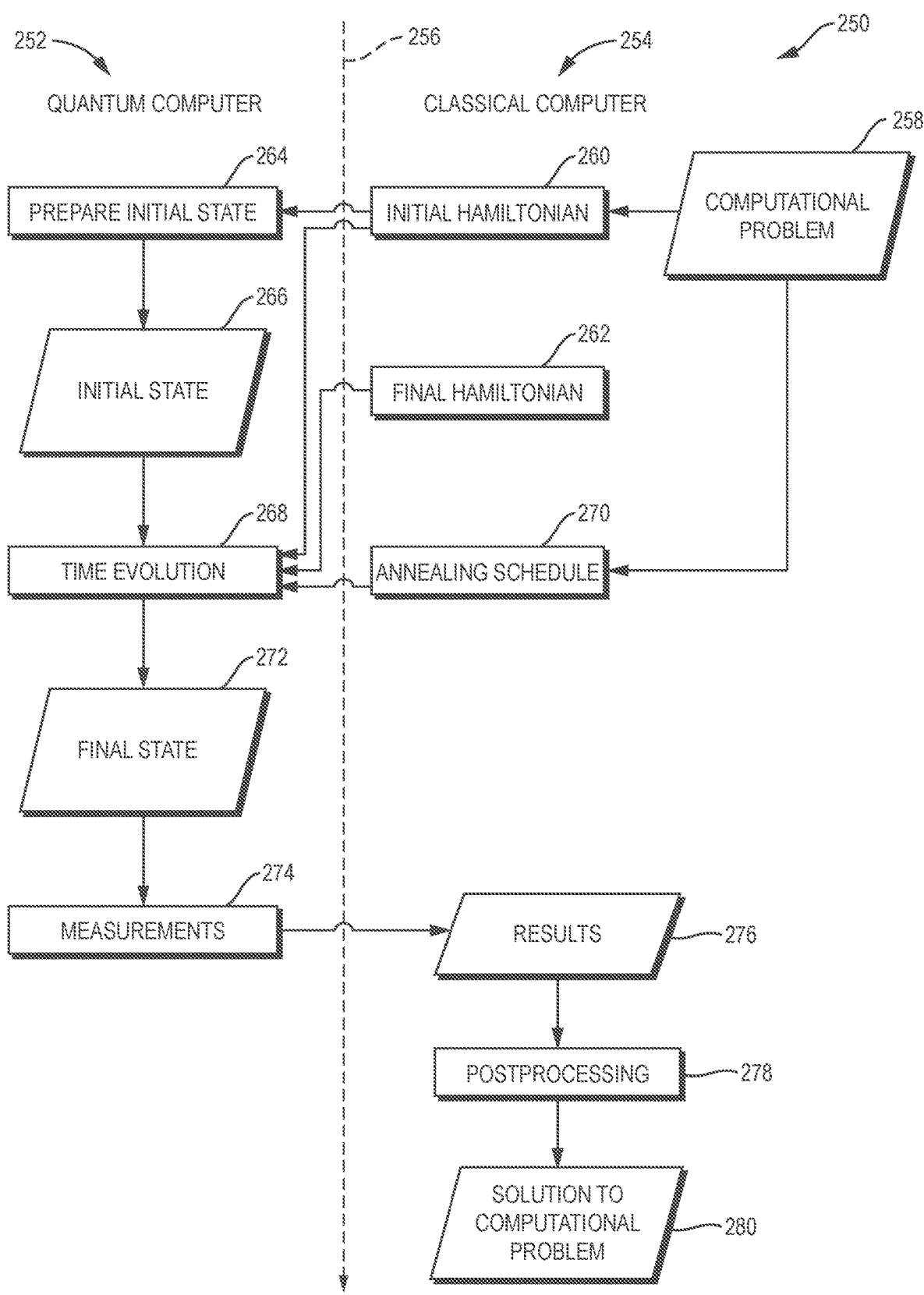
FIG. 2B is a diagram of a hybrid quantum-classical computer which performs quantum annealing according to one embodiment of the present invention.

FIG. 2B shows a diagram illustrating operations typically performed by a computer system 250 which implements quantum annealing. The system 250 includes both a quantum computer 252 and a classical computer 254. Operations shown on the left of the dashed vertical line 256 typically are performed by the quantum computer 252, while operations shown on the right of the dashed vertical line 256 typically are performed by the classical computer 254.

Quantum annealing starts with the classical computer 254 generating an initial Hamiltonian 260 and a final Hamiltonian 262 based on a computational problem 258 to be solved, and providing the initial Hamiltonian 260, the final Hamiltonian 262 and an annealing schedule 270 as input to the quantum computer 252. The quantum computer 252 prepares a well-known initial state 266 (FIG. 2B, operation 264), such as a quantum-mechanical superposition of all possible states (candidate states) with equal weights, based on the initial Hamiltonian 260. The classical computer 254 provides the initial Hamiltonian 260, a final Hamiltonian 262, and an annealing schedule 270 to the quantum computer 252. The quantum computer 252 starts in the initial state 266, and evolves its state according to the annealing schedule 270 following the time-dependent Schrödinger equation, a natural quantum-mechanical evolution of physical systems (FIG. 2B, operation 268). More specifically, the state of the quantum computer 252 undergoes time evolution under a time-dependent Hamiltonian, which starts from the initial Hamiltonian 260 and terminates at the final Hamiltonian 262. If the rate of change of the system Hamiltonian is slow enough, the system stays close to the ground state of the instantaneous Hamiltonian. If the rate of change of the system Hamiltonian is accelerated, the system may leave the ground state temporarily but produce a higher likelihood of concluding in the ground state of the final problem Hamiltonian, i.e., diabatic quantum computation. At the end of the time evolution, the set of qubits on the quantum annealer is in a final state 272, which is expected to be close to the ground state of the classical Ising model that corresponds to the solution to the original computational problem 258. An experimental demonstration of the success of quantum annealing for random magnets was reported immediately after the initial theoretical proposal.

The final state 272 of the quantum computer 252 is measured, thereby producing results 276 (i.e., measurements) (FIG. 2B, operation 274). The measurement operation 274 may be performed, for example, in any of the ways disclosed herein, such as in any of the ways disclosed herein in connection with the measurement unit 110 in FIG. 1. The classical computer 254 performs postprocessing on the measurement results 276 to produce output 280 representing a solution to the original computational problem 258 (FIG. 2B, operation 278).

As yet another alternative example, embodiments of the present invention may be implemented, in whole or in part, using a quantum computer that is implemented using a one-way quantum computing architecture, also referred to as a measurement-based quantum computing architecture, which is another alternative to the gate model quantum computing architecture. More specifically, the one-way or measurement based quantum computer (MBQC) is a method of quantum computing that first prepares an entangled resource state, usually a cluster state or graph state, then performs single qubit measurements on it. It is "one-way" because the resource state is destroyed by the measurements.

The outcome of each individual measurement is random, but they are related in such a way that the computation always succeeds. In general the choices of basis for later measurements need to depend on the results of earlier measurements, and hence the measurements cannot all be performed at the same time.

Any of the functions disclosed herein may be implemented using means for performing those functions. Such means include, but are not limited to, any of the components disclosed herein, such as the computer-related components described below.

Referring to FIG. 1, a diagram is shown of a system 100 implemented according to one embodiment of the present invention. Referring to FIG. 2A, a flowchart is shown of a method 200 performed by the system 100 of FIG. 1 according to one embodiment of the present invention. The system 100 includes a quantum computer 102. The quantum computer 102 includes a plurality of qubits 104, which may be implemented in any of the ways disclosed herein. There may be any number of qubits 104 in the quantum computer 102. For example, the qubits 104 may include or consist of no more than 2 qubits, no more than 4 qubits, no more than 8 qubits, no more than 16 qubits, no more than 32 qubits, no more than 64 qubits, no more than 128 qubits, no more than 256 qubits, no more than 512 qubits, no more than 1024 qubits, no more than 2048 qubits, no more than 4096 qubits, or no more than 8192 qubits. These are merely examples, in practice there may be any number of qubits 104 in the quantum computer 102.

There may be any number of gates in a quantum circuit. However, in some embodiments the number of gates may be at least proportional to the number of qubits 104 in the quantum computer 102. In some embodiments the gate depth may be no greater than the number of qubits 104 in the quantum computer 102, or no greater than some linear multiple of the number of qubits 104 in the quantum computer 102 (e.g., 2, 3, 4, 5, 6, or 7).

The qubits 104 may be interconnected in any graph pattern. For example, they be connected in a linear chain, a two-dimensional grid, an all-to-all connection, any combination thereof, or any subgraph of any of the preceding.

As will become clear from the description below, although element 102 is referred to herein as a "quantum computer," this does not imply that all components of the quantum computer 102 leverage quantum phenomena. One or more components of the quantum computer 102 may, for example, be classical (i.e., non-quantum components) components which do not leverage quantum phenomena.

The quantum computer 102 includes a control unit 106, which may include any of a variety of circuitry and/or other machinery for performing the functions disclosed herein. The control unit 106 may, for example, consist entirely of classical components. The control unit 106 generates and provides as output one or more control signals 108 to the qubits 104. The control signals 108 may take any of a variety of forms, such as any kind of electromagnetic signals, such as electrical signals, magnetic signals, optical signals (e.g., laser pulses), or any combination thereof.

For example:
  In embodiments in which some or all of the qubits 104 are implemented as photons (also referred to as a "quantum optical" implementation) that travel along waveguides, the control unit 106 may be a beam splitter (e.g., a heater or a mirror), the control signals 108 may be signals that control the heater or the rotation of the mirror, the measurement unit 110 may be a photodetector, and the measurement signals 112 may be photons.
  In embodiments in which some or all of the qubits 104 are implemented as charge type qubits (e.g., transmon, X-mon, G-mon) or flux-type qubits (e.g., flux qubits, capacitively shunted flux qubits) (also referred to as a "circuit quantum electrodynamic" (circuit QED) implementation), the control unit 106 may be a bus resonator activated by a drive, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as superconducting circuits, the control unit 106 may be a circuit QED-assisted control unit or a direct capacitive coupling control unit or an inductive capacitive coupling control unit, the control signals 108 may be cavity modes, the measurement unit 110 may be a second resonator (e.g., a low-Q resonator), and the measurement signals 112 may be voltages measured from the second resonator using dispersive readout techniques.

In embodiments in which some or all of the qubits 104 are implemented as trapped ions (e.g., electronic states of, e.g., magnesium ions), the control unit 106 may be a laser, the control signals 108 may be laser pulses, the measurement unit 110 may be a laser and either a CCD or a photodetector (e.g., a photomultiplier tube), and the measurement signals 112 may be photons.

In embodiments in which some or all of the qubits 104 are implemented using nuclear magnetic resonance (NMR) (in which case the qubits may be molecules, e.g., in liquid or solid form), the control unit 106 may be a radio frequency (RF) antenna, the control signals 108 may be RF fields emitted by the RF antenna, the measurement unit 110 may be another RF antenna, and the measurement signals 112 may be RF fields measured by the second RF antenna.

In embodiments in which some or all of the qubits 104 are implemented as nitrogen-vacancy centers (NV centers), the control unit 106 may, for example, be a laser, a microwave antenna, or a coil, the control signals 108 may be visible light, a microwave signal, or a constant electromagnetic field, the measurement unit 110 may be a photodetector, and the measurement signals 112 may be photons.

In embodiments in which some or all of the qubits 104 are implemented as two-dimensional quasiparticles called "anyons" (also referred to as a "topological quantum computer" implementation), the control unit 106 may be nanowires, the control signals 108 may be local electrical fields or microwave pulses, the measurement unit 110 may be superconducting circuits, and the measurement signals 112 may be voltages.

In embodiments in which some or all of the qubits 104 are implemented as semiconducting material (e.g., nanowires), the control unit 106 may be microfabricated gates, the control signals 108 may be RF or microwave signals, the measurement unit 110 may be microfabricated gates, and the measurement signals 112 may be RF or microwave signals.

Although not shown explicitly in FIG. 1 and not required, the measurement unit 110 may provide one or more feedback signals 114 to the control unit 106 based on the measurement signals 112. For example, quantum computers referred to as "one-way quantum computers" or "measurement-based quantum computers" utilize such feedback signal 114 from the measurement unit 110 to the control unit 106. Such feedback signal 114 is also necessary for the operation of fault-tolerant quantum computing and error correction.

The control signals 108 may, for example, include one or more state preparation signals which, when received by the qubits 104, cause some or all of the qubits 104 to change their states. Such state preparation signals constitute a quantum circuit also referred to as an "ansatz circuit." The resulting state of the qubits 104 is referred to herein as an "initial state" or an "ansatz state." The process of outputting the state preparation signal(s) to cause the qubits 104 to be in their initial state is referred to herein as "state preparation" (FIG. 2A, section 206). A special case of state preparation is "initialization," also referred to as a "reset operation," in which the initial state is one in which some or all of the qubits 104 are in the "zero" state i.e. the default single-qubit state. More generally, state preparation may involve using the state preparation signals to cause some or all of the qubits 104 to be in any distribution of desired states. In some embodiments, the control unit 106 may first perform initialization on the qubits 104 and then perform preparation on the qubits 104, by first outputting a first set of state preparation signals to initialize the qubits 104, and by then outputting a second set of state preparation signals to put the qubits 104 partially or entirely into non-zero states.

Another example of control signals 108 that may be output by the control unit 106 and received by the qubits 104 are gate control signals. The control unit 106 may output such gate control signals, thereby applying one or more gates to the qubits 104. Applying a gate to one or more qubits causes the set of qubits to undergo a physical state change which embodies a corresponding logical gate operation (e.g., single-qubit rotation, two-qubit entangling gate or multi-qubit operation) specified by the received gate control signal. As this implies, in response to receiving the gate control signals, the qubits 104 undergo physical transformations which cause the qubits 104 to change state in such a way that the states of the qubits 104, when measured (see below), represent the results of performing logical gate operations specified by the gate control signals. The term "quantum gate," as used herein, refers to the application of a gate control signal to one or more qubits to cause those qubits to undergo the physical transformations described above and thereby to implement a logical gate operation.

It should be understood that the dividing line between state preparation (and the corresponding state preparation signals) and the application of gates (and the corresponding gate control signals) may be chosen arbitrarily. For example, some or all the components and operations that are illustrated in FIGS. 1 and 2A-2B as elements of "state preparation" may instead be characterized as elements of gate application. Conversely, for example, some or all of the components and operations that are illustrated in FIGS. 1 and 2A-2B as elements of "gate application" may instead be characterized as elements of state preparation. As one particular example, the system and method of FIGS. 1 and 2A-2B may be characterized as solely performing state preparation followed by measurement, without any gate application, where the elements that are described herein as being part of gate application are instead considered to be part of state preparation. Conversely, for example, the system and method of FIGS. 1 and 2A-2B may be characterized as solely performing gate application followed by measurement, without any state preparation, and where the elements that are described herein as being part of state preparation are instead considered to be part of gate application.

The quantum computer 102 also includes a measurement unit 110, which performs one or more measurement operations on the qubits 104 to read out measurement signals 112 (also referred to herein as "measurement results") from the qubits 104, where the measurement results 112 are signals representing the states of some or all of the qubits 104. In practice, the control unit 106 and the measurement unit 110 may be entirely distinct from each other, or contain some components in common with each other, or be implemented using a single unit (i.e., a single unit may implement both the control unit 106 and the measurement unit 110). For example, a laser unit may be used both to generate the control signals 108 and to provide stimulus (e.g., one or more laser beams) to the qubits 104 to cause the measurement signals 112 to be generated.

In general, the quantum computer 102 may perform various operations described above any number of times. For example, the control unit 106 may generate one or more control signals 108, thereby causing the qubits 104 to perform one or more quantum gate operations. The measurement unit 110 may then perform one or more measurement operations on the qubits 104 to read out a set of one or more measurement signals 112. The measurement unit 110 may repeat such measurement operations on the qubits 104 before the control unit 106 generates additional control signals 108, thereby causing the measurement unit 110 to read out additional measurement signals 112 resulting from the same gate operations that were performed before reading out the previous measurement signals 112. The measurement unit 110 may repeat this process any number of times to generate any number of measurement signals 112 corresponding to the same gate operations. The quantum computer 102 may then aggregate such multiple measurements of the same gate operations in any of a variety of ways.

After the measurement unit 110 has performed one or more measurement operations on the qubits 104 after they have performed one set of gate operations, the control unit 106 may generate one or more additional control signals 108, which may differ from the previous control signals 108, thereby causing the qubits 104 to perform one or more additional quantum gate operations, which may differ from the previous set of quantum gate operations. The process described above may then be repeated, with the measurement unit 110 performing one or more measurement operations on the qubits 104 in their new states (resulting from the most recently-performed gate operations).

In general, the system 100 may implement a plurality of quantum circuits as follows. For each quantum circuit C in the plurality of quantum circuits (FIG. 2A, operation 202), the system 100 performs a plurality of "shots" on the qubits 104. The meaning of a shot will become clear from the description that follows. For each shot S in the plurality of shots (FIG. 2A, operation 204), the system 100 prepares the state of the qubits 104 (FIG. 2A, section 206). More specifically, for each quantum gate G in quantum circuit C (FIG. 2A, operation 210), the system 100 applies quantum gate G to the qubits 04 (FIG. 2A, operations 212 and 214).

Then, for each of the qubits Q 104 (FIG. 2A, operation 216), the system 100 measures the qubit Q to produce measurement output representing a current state of qubit Q (FIG. 2A, operations 218 and 220).

The operations described above are repeated for each shot S (FIG. 2A, operation 222), and circuit C (FIG. 2A, operation 224). As the description above implies, a single "shot" involves preparing the state of the qubits 104 and applying all of the quantum gates in a circuit to the qubits 104 and then measuring the states of the qubits 104; and the system 100 may perform multiple shots for one or more circuits.

Figure 3:
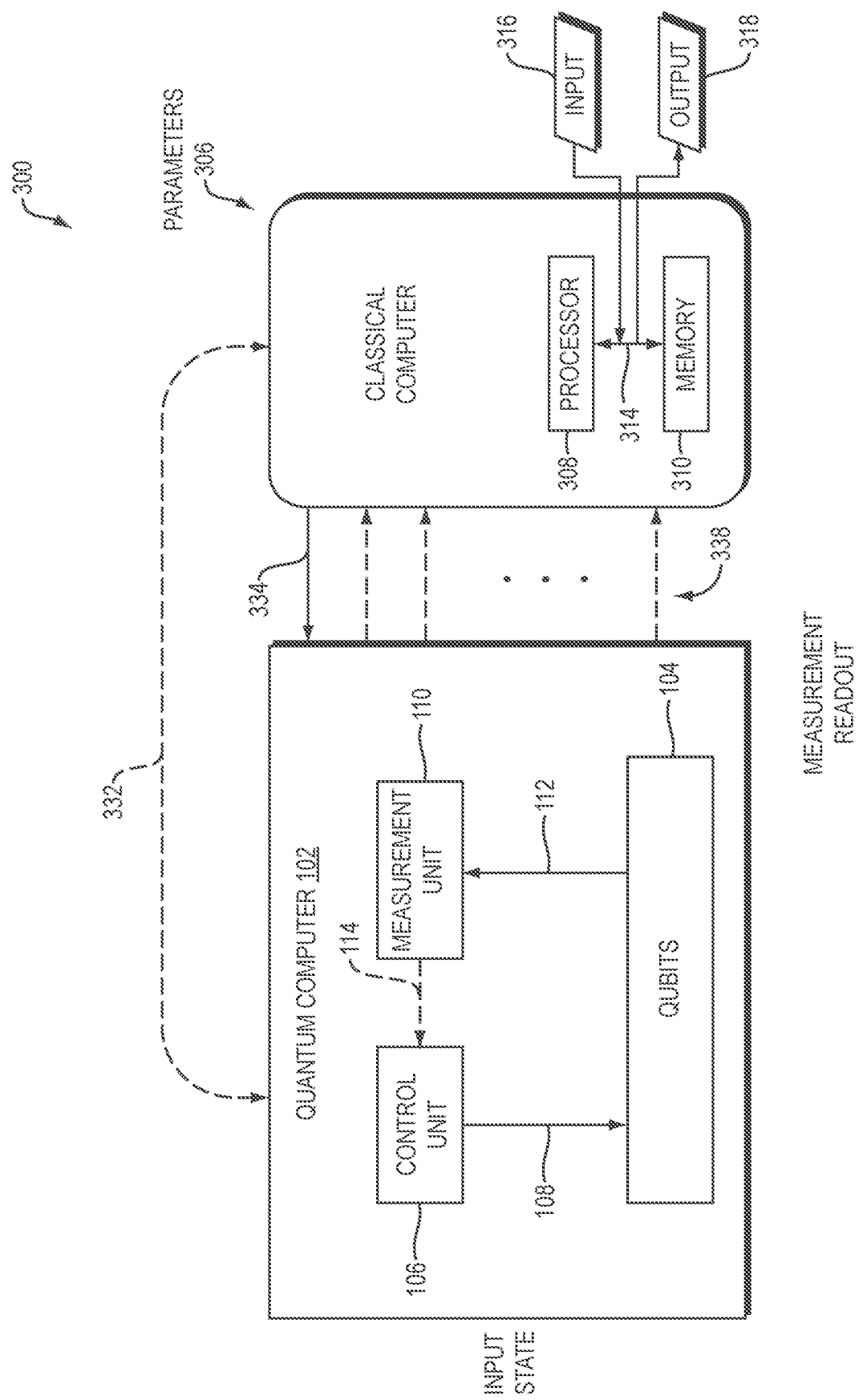
FIG. 3 is a diagram of a hybrid quantum-classical computer according to one embodiment of the present invention.

Referring to FIG. 3, a diagram is shown of a hybrid quantum-classical (HQC) computer 300 implemented according to one embodiment of the present invention. The HQC 300 includes a quantum computer component 102 (which may, for example, be implemented in the manner shown and described in connection with FIG. 1) and a classical computer component 306. The classical computer component may be a machine implemented according to the general computing model established by John Von Neumann, in which programs are written in the form of ordered lists of instructions and stored within a classical (e.g., digital) memory 310 and executed by a classical (e.g., digital) processor 308 of the classical computer. The memory 310 is classical in the sense that it stores data in a storage medium in the form of bits, which have a single definite binary state at any point in time. The bits stored in the memory 310 may, for example, represent a computer program. The classical computer component 304 typically includes a bus 314. The processor 308 may read bits from and write bits to the memory 310 over the bus 314. For example, the processor 308 may read instructions from the computer program in the memory 310, and may optionally receive input data 316 from a source external to the computer 302, such as from a user input device such as a mouse, keyboard, or any other input device. The processor 308 may use instructions that have been read from the memory 310 to perform computations on data read from the memory 310 and/or the input 316, and generate output from those instructions. The processor 308 may store that output back into the memory 310 and/or provide the output externally as output data 318 via an output device, such as a monitor, speaker, or network device.

The quantum computer component 102 may include a plurality of qubits 104, as described above in connection with FIG. 1. A single qubit may represent a one, a zero, or any quantum superposition of those two qubit states. The classical computer component 304 may provide classical state preparation signals 332 to the quantum computer 102, in response to which the quantum computer 102 may prepare the states of the qubits 104 in any of the ways disclosed herein, such as in any of the ways disclosed in connection with FIGS. 1 and 2A-2B.

Once the qubits 104 have been prepared, the classical processor 308 may provide classical control signals 334 to the quantum computer 102, in response to which the quantum computer 102 may apply the gate operations specified by the control signals 332 to the qubits 104, as a result of which the qubits 104 arrive at a final state. The measurement unit 110 in the quantum computer 102 (which may be implemented as described above in connection with FIGS. 1 and 2A-2B) may measure the states of the qubits 104 and produce measurement output 338 representing the collapse of the states of the qubits 104 into one of their eigenstates. As a result, the measurement output 338 includes or consists of bits and therefore represents a classical state. The quantum computer 102 provides the measurement output 338 to the classical processor 308. The classical processor 308 may store data representing the measurement output 338 and/or data derived therefrom in the classical memory 310.

The steps described above may be repeated any number of times, with what is described above as the final state of the qubits 104 serving as the initial state of the next iteration. In this way, the classical computer 304 and the quantum computer 102 may cooperate as co-processors to perform joint computations as a single computer system.

Although certain functions may be described herein as being performed by a classical computer and other functions may be described herein as being performed by a quantum computer, these are merely examples and do not constitute limitations of the present invention. A subset of the functions which are disclosed herein as being performed by a quantum computer may instead be performed by a classical computer. For example, a classical computer may execute functionality for emulating a quantum computer and provide a subset of the functionality described herein, albeit with functionality limited by the exponential scaling of the simulation. Functions which are disclosed herein as being performed by a classical computer may instead be performed by a quantum computer.

The techniques described above may be implemented, for example, in hardware, in one or more computer programs tangibly stored on one or more computer-readable media, firmware, or any combination thereof, such as solely on a quantum computer, solely on a classical computer, or on a hybrid quantum-classical (HQC) computer. The techniques disclosed herein may, for example, be implemented solely on a classical computer, in which the classical computer emulates the quantum computer functions disclosed herein.

The techniques described above may be implemented in one or more computer programs executing on (or executable by) a programmable computer (such as a classical computer, a quantum computer, or an HQC) including any combination of any number of the following: a processor, a storage medium readable and/or writable by the processor (including, for example, volatile and non-volatile memory and/or storage elements), an input device, and an output device. Program code may be applied to input entered using the input device to perform the functions described and to generate output using the output device.

Embodiments of the present invention include features which are only possible and/or feasible to implement with the use of one or more computers, computer processors, and/or other elements of a computer system. Such features are either impossible or impractical to implement mentally and/or manually. For example, receiving data from a classical distribution and encoding that data into a quantum set cannot be done manually because a manual calculation of transformations to be performed to change data stored by a qubit in a quantum computer would not have the result of actually modifying the data stored by the qubit. As another example, embodiments which require classical computing components and quantum computing components to exchange data require manipulation of physical systems and improvements to the underlying technologies, not mental processes alone.

Any claims herein which affirmatively require a computer, a processor, a memory, or similar computer-related elements, are intended to require such elements, and should not be interpreted as if such elements are not present in or required by such claims. Such claims are not intended, and should not be interpreted, to cover methods and/or systems which lack the recited computer-related elements. For example, any method claim herein which recites that the claimed method is performed by a computer, a processor, a memory, and/or similar computer-related element, is intended to, and should only be interpreted to, encompass methods which are performed by the recited computer-related element(s). Such a method claim should not be interpreted, for example, to encompass a method that is performed mentally or by hand (e.g., using pencil and paper). Similarly, any product claim herein which recites that the claimed product includes a computer, a processor, a memory, and/or similar computer-related element, is intended to, and should only be interpreted to, encompass products which include the recited computer-related element(s). Such a product claim should not be interpreted, for example, to encompass a product that does not include the recited computer-related element(s).

In embodiments in which a classical computing component executes a computer program providing any subset of the functionality within the scope of the claims below, the computer program may be implemented in any programming language, such as assembly language, machine language, a high-level procedural programming language, or an object-oriented programming language. The programming language may, for example, be a compiled or interpreted programming language.

Each such computer program may be implemented in a computer program product tangibly embodied in a machine-readable storage device for execution by a computer processor, which may be either a classical processor or a quantum processor. Method steps of the invention may be performed by one or more computer processors executing a program tangibly embodied on a computer-readable medium to perform functions of the invention by operating on input and generating output. Suitable processors include, by way of example, both general and special purpose microprocessors. Generally, the processor receives (reads) instructions and data from a memory (such as a read-only memory and/or a random access memory) and writes (stores) instructions and data to the memory. Storage devices suitable for tangibly embodying computer program instructions and data include, for example, all forms of non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A classical computer can generally also receive (read) programs and data from, and write (store) programs and data to, a non-transitory computer-readable storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium.

Any data disclosed herein may be implemented, for example, in one or more data structures tangibly stored on a non-transitory computer-readable medium (such as a classical computer-readable medium, a quantum computer-readable medium, or an HQC computer-readable medium). Embodiments of the invention may store such data in such data structure(s) and read such data from such data structure(s).

What is claimed is:

1. A device comprising:
   a variational quantum generator circuit comprising:
      a first quantum encoding circuit, which receives as input a real value z from a classical distribution and encodes the real value as an input quantum state $|R(z)\rangle$, having r qubits; and
      a quantum generator circuit $G(\Theta_g)$, which receives the input quantum state and acts on a register of n qubits including the input quantum state, with n≥r, and which generates classical data $x_{Fake}$ by measuring, by a measurement decoding component, at least one expectation value of an output state $|\psi(x)\rangle$ relative to a fixed set of observables.

2. The device of claim 1, wherein the at least one expectation value of the fixed set of observables is expressed as strings of Pauli matrices $\{P_i\}_{i=1,\ldots,M}$, as shown in the following equation:

$$x_{Fake} = f(\alpha[\langle P_1 \rangle, \langle P_2 \rangle, \ldots, \langle P_M \rangle] + \beta)$$

where $\langle P_i \rangle = \langle \psi(x)|P_i|\psi(x)\rangle$, and $\alpha$ and $\beta$ are real parameters that adjust range of the observed data and $f$ is a mathematical function acting on the composed output measurements.

3. The device of claim 1, further comprising functionality for transmitting the generated data $x_{Fake}$ to a classical computing component for additional processing.

4. The device of claim 1, further comprising functionality for transmitting the generated data $x_{Fake}$ to a classical discriminator executed by a classical computing component for additional processing.

5. The device of claim 1, further comprising functionality for transmitting the generated data $x_{Fake}$ to a neural network executed by a classical computing component for additional processing.

6. The device of claim 1, wherein the measurement decoding component further comprises functionality for applying a measurement decoding scheme to a value stored by at least one of the n qubits, wherein applying the measurement decoding scheme modifies the measured qubit.

7. The device of claim 1, wherein the quantum generator circuit further comprises functionality for modifying a physical state of at least one qubit in the register of n qubits to put the at least one qubit into the input quantum state in accordance with the result of applying an encoding scheme to the real value.

8. The device of claim 1, further comprising a second quantum encoding circuit receiving a real value x, applying a variational encoding algorithm to encode the real value x as a quantum state output, and transmitting the quantum output state to a quantum discriminator.

9. The device of claim 1, further comprising a second quantum encoding circuit receiving a real value x, applying an amplitude encoding algorithm to encode the real value x as a quantum state output, and transmitting the quantum output state to a quantum discriminator.

10. The device of claim 1, further comprising a second quantum encoding circuit receiving data $x_{Fake}$ from the quantum generator circuit, applying a variational encoding algorithm to encode the received data $x_{Fake}$ into a quantum output state, and transmitting the quantum output state to a quantum discriminator.

11. The device of claim 1, further comprising a second quantum encoding circuit receiving data $x_{Fake}$ from the quantum generator circuit, applying an amplitude encoding algorithm to encode the received data $x_{Fake}$ into a quantum output state, and transmitting the quantum output state to a quantum discriminator.

12. The device of claim 1 further comprising a quantum discriminator receiving at least one quantum output state from a second quantum encoding circuit and measuring an observable in the received at least one quantum output state.

13. The device of claim 12, wherein measuring the observable comprises measuring a designated qubit.

14. The device of claim 13, wherein the quantum discriminator further comprises functionality for applying a measurement scheme to measure the designated qubit, wherein applying the measurement scheme to measure the designated qubit modifies a physical state of the measured designated qubit.

15. The device of claim 12, wherein the quantum discriminator further comprises functionality for identifying a probability that the quantum output state belongs to the received classical distribution based on the measurement of the designated qubit.

16. The device of claim 12, wherein the quantum discriminator further comprises functionality for identifying a probability that the received at least one quantum output state belongs to the received data $x_{Fake}$ based on the measurement of a designated qubit.

17. The device of claim 12, wherein the quantum discriminator further comprises functionality for evaluating a cost function representing a level of difference between the received input from the classical distribution and the received data $x_{Fake}$.

18. The device of claim 12, wherein the quantum discriminator further comprises functionality for generating a cost function representing a level of difference between the received input from the classical distribution and the received data $x_{Fake}$, wherein the received input further comprises a plurality of data points and the received data further comprises a plurality of data points.

19. The device of claim 12, wherein the quantum discriminator further comprises functionality for applying a variational circuit to the received at least one quantum output state.

20. The device of claim 12, wherein the quantum discriminator further comprises functionality for applying amplitude encoding to the received at least one quantum output state.

21. The device of claim 1, further comprising:
a classical computing component implementing a von Neumann architecture; and
wherein a quantum computing component is in communication with the classical computing component.

22. The device of claim 21, wherein the quantum computing component further comprises functionality for transmitting the generated data $x_{Fake}$ to the classical computing component for additional processing.

23. The device of claim 21, further comprising a classical discriminator, and wherein the quantum computing component further comprises functionality for transmitting the generated data $x_{Fake}$ to the classical discriminator executed by the classical computing component for additional processing.

24. The device of claim 21, wherein the classical computing component comprises an artificial neural network, and wherein the quantum computing component further comprises functionality for transmitting the generated data $x_{Fake}$ to the artificial neural network for additional processing.

25. The device of claim 21, wherein the quantum generator circuit further comprises functionality for applying a measurement decoding scheme to a value stored by at least one of the n qubits, wherein applying the measurement decoding scheme modifies a physical state of the measured qubit.

26. The device of claim 21, wherein the quantum generator circuit further comprises functionality for modifying a physical state of at least one qubit in the register of n qubits to put the at least one qubit into the input quantum state in accordance with the result of applying an encoding scheme to the real value.

27. The device of claim 21, further comprising a second quantum encoding circuit receiving the real value z, applying a variational encoding algorithm to encode the real value z as a quantum state output, and transmitting the quantum output state to a quantum discriminator.

28. The device of claim 21, further comprising a second quantum encoding circuit receiving the real value z, applying an amplitude encoding algorithm to encode the real value z as a quantum state output, and transmitting the quantum output state to a quantum discriminator.

29. The device of claim 21, further comprising a second quantum encoding circuit receiving data $x_{Fake}$ from the quantum generator circuit, applying a variational encoding algorithm to encode the received data $x_{Fake}$ into a quantum output state, and transmitting the quantum output state to a quantum discriminator.

30. The device of claim 21, further comprising a second quantum encoding circuit receiving data $x_{Fake}$ from the quantum generator circuit, applying an amplitude encoding algorithm to encode the received data $x_{Fake}$ into a quantum output state, and transmitting the quantum output state to a quantum discriminator.

31. The device of claim 21, further comprising a quantum discriminator receiving at least one quantum output state from a second quantum encoding circuit, applying a variational circuit to the received at least one quantum output state, and measuring a designated qubit in the received at least one quantum output state.

32. The device of claim 31, wherein the quantum discriminator further comprises functionality for applying a measurement scheme to measure the designated qubit, wherein applying the measurement scheme modifies a physical state of the measured designated qubit.

33. The device of claim 31, wherein the quantum discriminator further comprises functionality for identifying a probability that the quantum output state belongs to the received classical distribution based on the measurement of the designated qubit.

34. The device of claim 30, wherein the quantum discriminator further comprises functionality for identifying a probability that the received at least one quantum output state belongs to the received data $x_{Fake}$ based on the measurement of a designated qubit.

35. The device of claim 30, wherein the quantum discriminator further comprises functionality for generating an optimized cost function representing a level of difference between the received input from the classical distribution and the received data $x_{Fake}$.

36. The device of claim 21, further comprising:
a second quantum encoding circuit receiving the real value z, applying an encoding algorithm to encode the real value z as a quantum state output; and
a quantum discriminator receiving the quantum output state from the second quantum encoding circuit, applying a variational circuit to the received at least one quantum output state, and measuring a designated qubit in the received at least one quantum output state to determine whether the quantum output state belongs to the classical distribution or to the received data $x_{Fake}$.

37. The device of claim 21, further comprising:
a second quantum encoding circuit receiving a value from the data $x_{Fake}$, applying an encoding algorithm to encode the received value as a quantum state output; and
a quantum discriminator receiving the quantum output state from the second quantum encoding circuit, applying a variational circuit to the received at least one quantum output state, and measuring a designated qubit in the received at least one quantum output state to determine whether the quantum output state belongs to the classical distribution or to the data $x_{Fake}$.

38. The device of claim 21, further comprising:
functionality for transmitting, to a classical discriminator of the classical computing component, $x_{Fake}$.

39. A method performed by a device, the device comprising a variational quantum generator circuit, the method comprising:
at a first quantum encoding circuit in the variational quantum generator circuit, receiving as input a real value z from a classical distribution and encodes the real value as an input quantum state |R(z)⟩, having r qubits; and
at a quantum generator circuit $G(\Theta_g)$ in the variational quantum generator circuit:
receiving the input quantum state and acts on a register of n qubits including the input quantum state, with n≥r, and
generating classical data $x_{Fake}$ by measuring, by a measurement decoding component, at least one expectation value of an output state |ψ(x)⟩ relative to a fixed set of observables.

40. The method of claim 39, wherein the at least one expectation value of the fixed set of observables is expressed as strings of Pauli matrices $\{P_i\}_{i=1,\ldots,M}$, as shown in the following equation:

$$x_{Fake} = f(\alpha[\langle P_1 \rangle, \langle P_2 \rangle, \ldots, \langle P_M \rangle] + \beta)$$

where $\langle P_i \rangle = \langle \psi(x)|P_i|\psi(x)\rangle$, and $\alpha$ and $\beta$ are real parameters that adjust range of the observed data and $f$ is a mathematical function acting on the composed output measurements.

41. The method of claim 39, further comprising transmitting the generated data $x_{Fake}$ to a classical computing component for additional processing.

42. The method of claim 39, further comprising transmitting the generated data $x_{Fake}$ to a classical discriminator executed by a classical computing component for additional processing.

43. The method of claim 39, further comprising transmitting the generated data $x_{Fake}$ to a neural network executed by a classical computing component for additional processing.

44. The method of claim 39, further comprising functionality for applying a measurement decoding scheme to a value stored by at least one of the n qubits, wherein applying the measurement decoding scheme modifies the measured qubit.

45. The method of claim 39, further comprising modifying at least one qubit in the register of n qubits to put the at least one qubit into the input quantum state in accordance with a result of applying an encoding scheme to the real value.

46. The method of claim 39, further comprising, at a second quantum encoding circuit:
receiving the real value x,
applying a variational encoding algorithm to encode the real value x as a quantum state output, and
transmitting the quantum output state to a quantum discriminator.

47. The method of claim 39, further comprising, a second quantum encoding circuit:
receiving the real value x,
applying an amplitude encoding algorithm to encode the real value x as a quantum state output, and transmitting the quantum output state to a quantum discriminator.

48. The method of claim 39, further comprising, at a second quantum encoding circuit:
receiving data $x_{Fake}$ from the quantum generator circuit,
applying a variational encoding algorithm to encode the received data $x_{Fake}$ into a quantum output state, and
transmitting the quantum output state to a quantum discriminator.

49. The method of claim 39, further comprising, at a second quantum encoding circuit:
receiving data $x_{Fake}$ from the quantum generator circuit,
applying an amplitude encoding algorithm to encode the received data $x_{Fake}$ into a quantum output state, and
transmitting the quantum output state to a quantum discriminator.

50. The method of claim 39, further comprising, at a quantum discriminator:
receiving at least one quantum output state from a second quantum encoding circuit, and
measuring an observable in the received at least one quantum output state.

51. The method of claim 50, wherein measuring the observable comprises measuring a designated qubit.

52. The method of claim 51, further comprising:
applying a measurement scheme to measure the designated qubit, wherein applying the measurement scheme to measure the designated qubit modifies a physical state of the measured designated qubit.

53. The method of claim 50, further comprising:
identifying a probability that the quantum output state belongs to the received classical distribution based on the measurement of a designated qubit.

54. The method of claim 50, further comprising:
identifying a probability that the received at least one quantum output state belongs to the received data $x_{Fake}$ based on the measurement of a designated qubit.

55. The method of claim 50, further comprising:
evaluating a cost function representing a level of difference between the received input from the classical distribution and the received data $x_{Fake}$.

56. The method of claim 50, further comprising:
generating an optimized cost function representing a level of difference between the received input from the classical distribution and the received data $x_{Fake}$, wherein the received input further comprises a plurality of data points and the received data further comprises a plurality of data points.

57. The method of claim 50, further comprising:
applying a variational circuit to the received at least one quantum output state.

58. The method of claim 50, further comprising:
applying amplitude encoding to the received at least one quantum output state.

59. The method of claim 39, wherein the device further comprises a classical computing component implementing a von Neumann architecture, and wherein the method further comprises:
at a second quantum encoding circuit, receiving the real value z, applying an encoding algorithm to encode the real value z as a quantum state output; and
at a quantum discriminator:
receiving the quantum output state from the second quantum encoding circuit,
applying a variational circuit to the received at least one quantum output state, and
measuring a designated qubit in the received at least one quantum output state to determine whether the quantum output state belongs to the classical distribution or to the received data $x_{Fake}$.

60. The method of claim 39, wherein the device further comprises a classical computing component implementing a von Neumann architecture, and wherein the method further comprises:
at a second quantum encoding circuit:
receiving a value from the data $x_{Fake}$, and
applying an encoding algorithm to encode the received value as a quantum state output; and
at a quantum discriminator:
receiving the quantum output state from the second quantum encoding circuit,
applying a variational circuit to the received at least one quantum output state, and
measuring a designated qubit in the received at least one quantum output state to determine whether the quantum output state belongs to the classical distribution or to the data $x_{Fake}$.

61. The method of claim 39, further comprising:
transmitting, to a classical discriminator of a classical computing component implementing a von Neumann architecture, $x_{Fake}$.

* * * * *